(12) United States Patent
Hayashi et al.

(10) Patent No.: US 11,547,947 B2
(45) Date of Patent: Jan. 10, 2023

(54) ROBOT HOUSING MOVEMENT MECHANISM

(71) Applicant: GROOVE X, Inc., Tokyo (JP)

(72) Inventors: Kaname Hayashi, Tokyo (JP); Yuichi Onda, Tokyo (JP)

(73) Assignee: GROOVE X, INC., Tokyo (JP)

( * ) Notice: Subject to any disclaimer, the term of this patent is extended or adjusted under 35 U.S.C. 154(b) by 147 days.

(21) Appl. No.: 16/905,917

(22) Filed: Jun. 19, 2020

(65) Prior Publication Data

US 2020/0316482 A1 Oct. 8, 2020

Related U.S. Application Data

(63) Continuation of application No. PCT/JP2018/047699, filed on Dec. 26, 2018.

(30) Foreign Application Priority Data

Dec. 28, 2017 (JP) .............................. JP2017-253031

(51) Int. Cl.
*A63H 3/52* (2022.01)
*A63H 11/00* (2006.01)
(Continued)

(52) U.S. Cl.
CPC ................. *A63H 3/52* (2013.01); *A63H 9/00* (2013.01); *A63H 11/00* (2013.01); *A63H 33/003* (2013.01); *A63H 33/005* (2013.01)

(58) Field of Classification Search
CPC .......... A63H 3/52; A63H 11/00; A63H 17/00; A63H 17/262; A63H 33/003; A63H 33/005
See application file for complete search history.

(56) References Cited

U.S. PATENT DOCUMENTS

| 1,446,466 A | * | 2/1923 | Huth | ........................ | A63H 3/04 |
| | | | | | 223/66 |
| 6,565,371 B1 | | 5/2003 | Watanabe | | |

(Continued)

FOREIGN PATENT DOCUMENTS

| CN | 101554533 A | 10/2009 |
| JP | 2000323219 A | 11/2000 |

(Continued)

OTHER PUBLICATIONS

International Search Report in PCT/JP2018/047699, dated Mar. 12, 2019. 4pp.

(Continued)

*Primary Examiner* — Eugene L Kim
*Assistant Examiner* — Alyssa M Hylinski
(74) *Attorney, Agent, or Firm* — Hauptman Ham, LLP

(57) ABSTRACT

A robot has a main body frame, an elastic body that forms a closed space between the elastic body and the main body frame, a movement mechanism that has a surface that is grounded when moving, and which is provided so as to be able to be housed in the closed space, and a drive mechanism that causes the movement mechanism to advance to an exterior of the closed space or to retreat into an interior. The elastic body elastically transforms owing to a pressing force received in accompaniment to an advancing of the movement mechanism, increasing the size of an aperture portion for exposing the movement mechanism, and elastically recovers in accompaniment to a retreat of the movement mechanism, reducing the size of the aperture portion.

22 Claims, 16 Drawing Sheets

(51) Int. Cl.
*A63H 33/00* (2006.01)
*A63H 9/00* (2006.01)

(56) References Cited

U.S. PATENT DOCUMENTS

| | | | | |
|---|---|---|---|---|
| 6,645,101 | B1* | 11/2003 | Wong | A63B 43/00 473/594 |
| 6,702,644 | B1* | 3/2004 | Hornsby | A63H 3/008 446/268 |
| 8,517,791 | B2* | 8/2013 | Yamada | A63H 33/26 446/129 |
| 2002/0193045 | A1 | 12/2002 | Lee et al. | |
| 2004/0043696 | A1* | 3/2004 | Suzuki | A63H 3/28 446/268 |
| 2005/0228540 | A1 | 10/2005 | Moridaira | |
| 2008/0194176 | A1* | 8/2008 | Pennington | A63H 3/04 446/373 |
| 2009/0253350 | A1* | 10/2009 | Kobayashi | A63H 33/005 446/490 |
| 2012/0290111 | A1* | 11/2012 | Badavne | G06N 3/008 901/1 |
| 2013/0330162 | A1 | 12/2013 | Horinouchi | |
| 2016/0000282 | A1* | 1/2016 | Vanderstegen-Drake | A47L 11/4072 280/6.157 |
| 2016/0361661 | A1* | 12/2016 | Tiefel | A63H 33/003 |
| 2017/0106297 | A1* | 4/2017 | Hashemi | A63H 3/006 |
| 2018/0065055 | A1* | 3/2018 | Bedford | A63H 3/52 |
| 2018/0299864 | A1* | 10/2018 | Byers | G06N 20/00 |
| 2019/0077018 | A1 | 3/2019 | Hayashi | |

FOREIGN PATENT DOCUMENTS

| | | | |
|---|---|---|---|
| JP | 2003181152 | A | 7/2003 |
| JP | 2004306251 | A | 11/2004 |
| JP | 200682142 | A | 3/2006 |
| JP | 2008260117 | A | 10/2008 |
| JP | 2015229230 | A | 12/2015 |
| KR | 2012111519 | A * | 10/2012 |
| WO | 2013099104 | A1 | 7/2013 |
| WO | 2017195700 | A1 | 11/2017 |

OTHER PUBLICATIONS

Office Action in CN Application No. 201880083486.6, dated Oct. 8, 2022. 14pp.

* cited by examiner

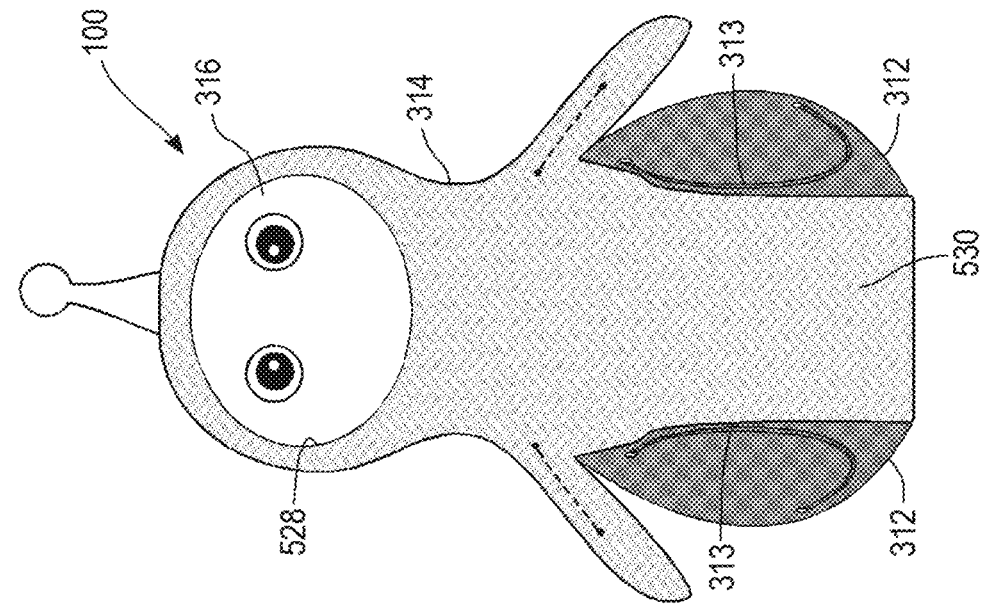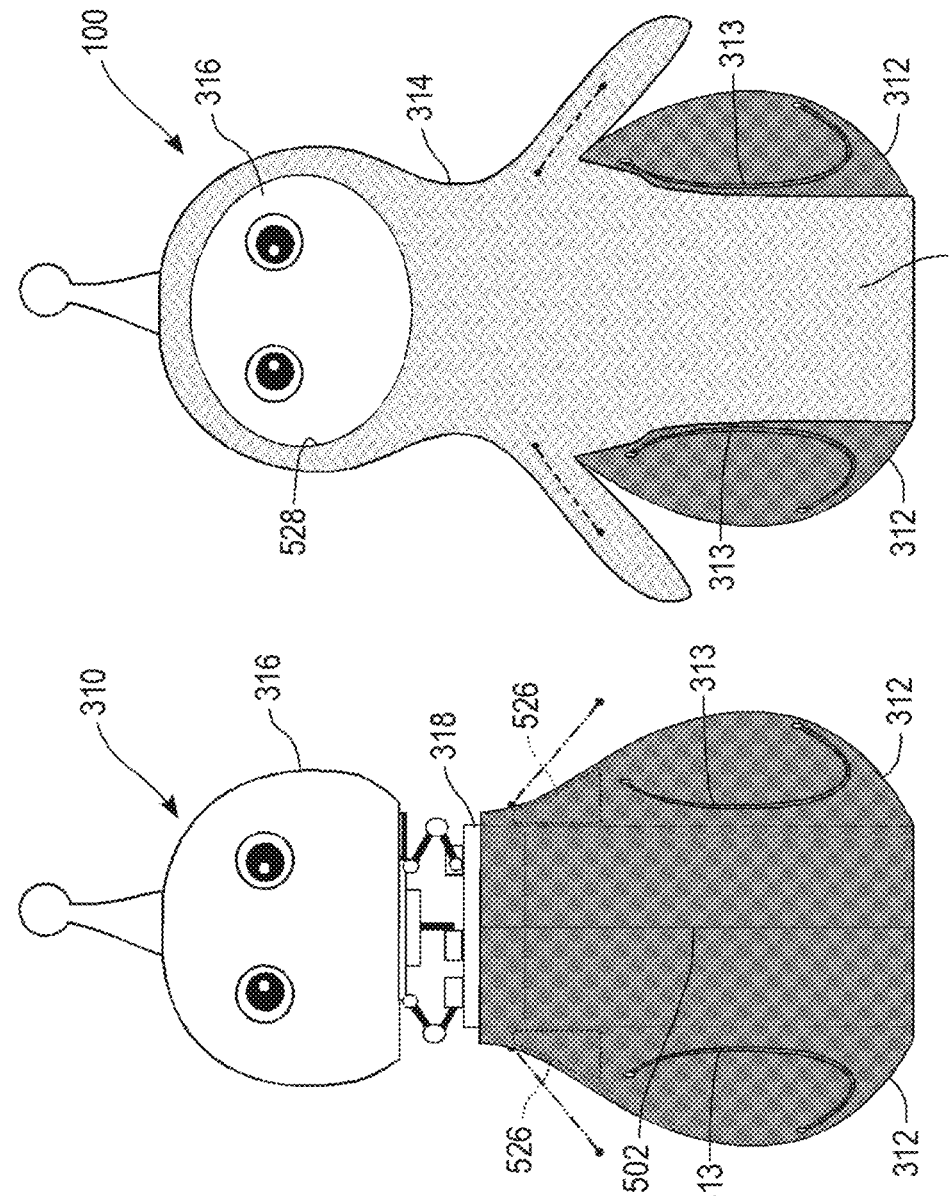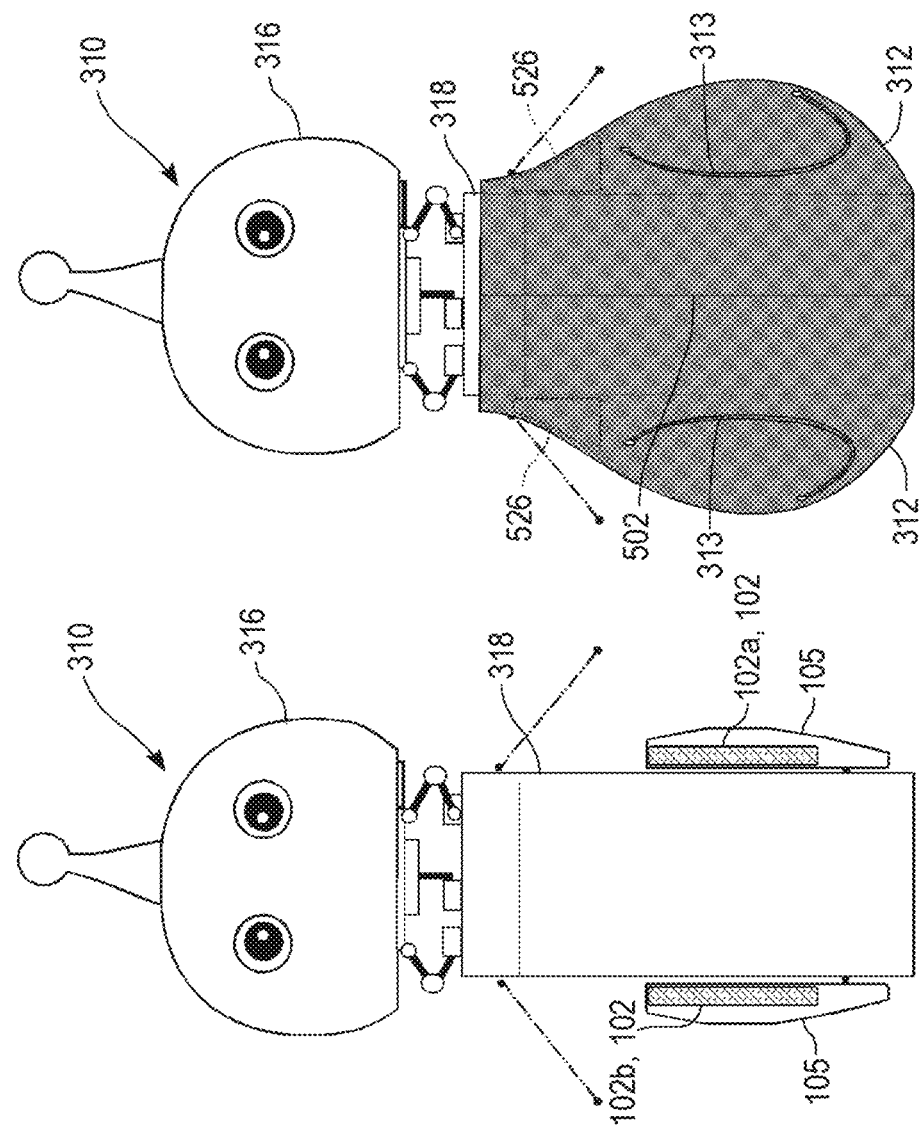

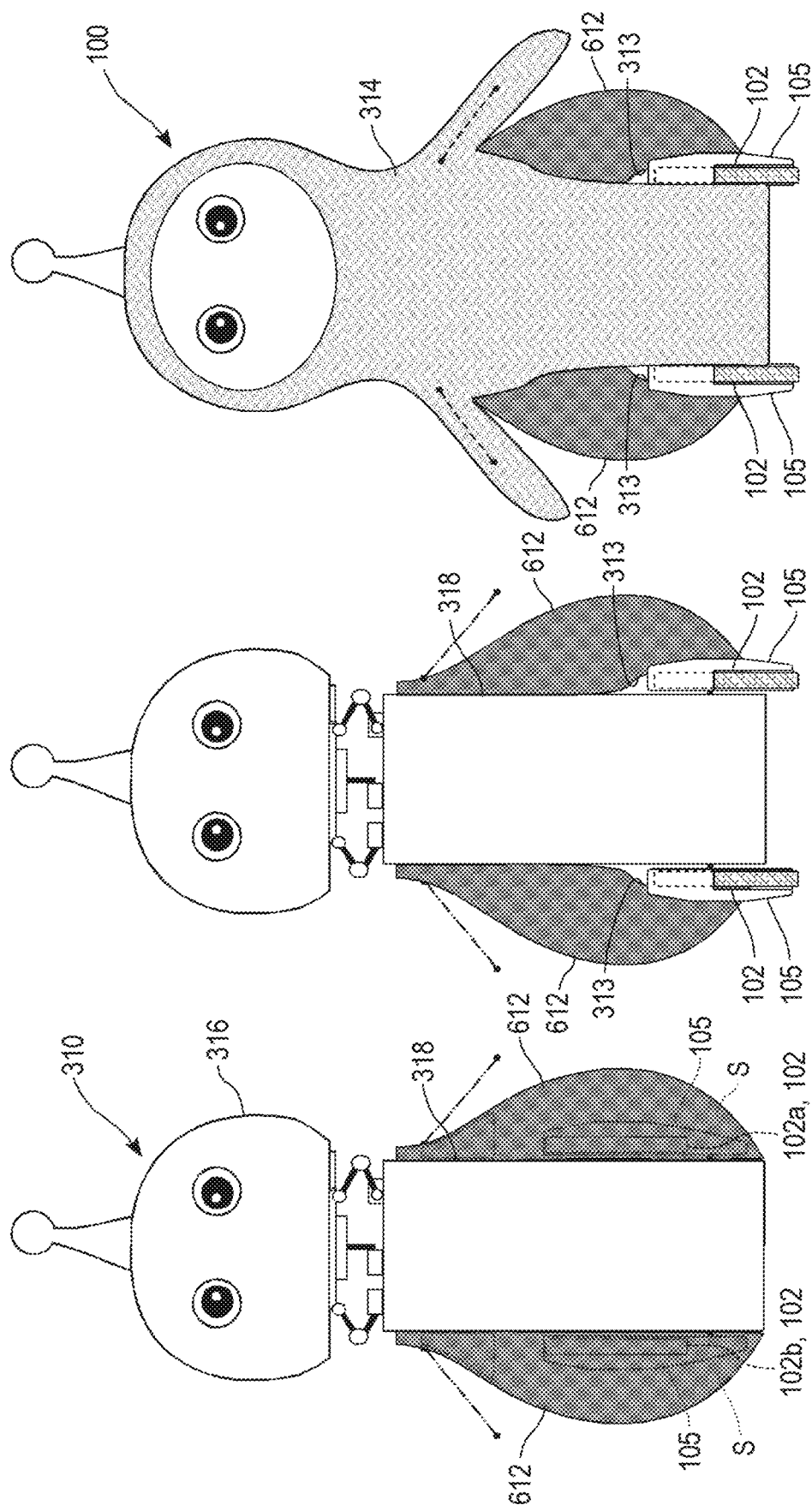

ROBOT HOUSING MOVEMENT MECHANISM

RELATED APPLICATIONS

The present application is a continuation of International Application No. PCT/JP2018/047699, filed Dec. 26, 2018, which claims priority from Japanese Application No. 2017-253031, filed Dec. 28, 2017, the disclosures of which applications are hereby incorporated by reference herein in their entirety.

BACKGROUND OF THE INVENTION

1. Field of the Invention

The present invention relates to a robot that includes a movement mechanism.

2. Related Art

There have been advances in development of an autonomously acting robot, such as a humanoid robot or a pet robot, that provides interaction and solace for a human (for example, refer to JP-A-2000-323219). A robot that causes behavior to evolve by learning autonomously based on a peripheral situation, creating an appearance of being alive, is also starting to appear as this kind of robot.

SUMMARY OF THE INVENTION

When attempting to provide a robot with an appearance of intimacy like that of a pet, physical closeness with a user is essential. Realizing an external appearance or a gesture such that the user feels an instinctive urge to pick up and hug the robot is an obvious requirement, and giving consideration to enabling the user to pick up and hug the robot easily is also necessary.

The invention having been completed based on a recognition of the heretofore described problem, a main object thereof is to provide a robot structure that incorporates consideration toward a user.

An aspect of the invention is a robot. The robot includes a main body frame, an elastic body that forms a closed space between the elastic body and the main body frame, a movement mechanism that has a surface that is grounded when moving, and which is provided so as to be able to be housed in the closed space, and a drive mechanism that causes the movement mechanism to advance to an exterior of the closed space or to retreat into an interior. The elastic body elastically transforms owing to a pressing force received in accompaniment to an advancing of the movement mechanism, increasing the size of an aperture portion for exposing the movement mechanism, and elastically recovers in accompaniment to a retreat of the movement mechanism, reducing the size of the aperture portion.

Another aspect of the invention is also a robot. The robot includes a body, a body forming member that configures one portion of the body and has a housing space inside, a movement mechanism that has a surface that is grounded when moving, and which is provided so as to be able to be housed in the housing space, and a drive mechanism that causes the movement mechanism to reciprocate between the housing space and an exterior. The body forming member has a flexible region forming an aperture portion that is pushed apart in accompaniment to an advancing of the movement mechanism.

According to the invention, a robot structure that incorporates consideration toward a user can be provided.

BRIEF DESCRIPTION OF THE DRAWINGS

FIGS. 9A to 9C are drawings schematically representing a method of assembling the body;

FIGS. 11A to 11C are drawings representing a wheel housing structure according to a second modification;

DETAILED DESCRIPTION OF THE INVENTION

Figure 1A:
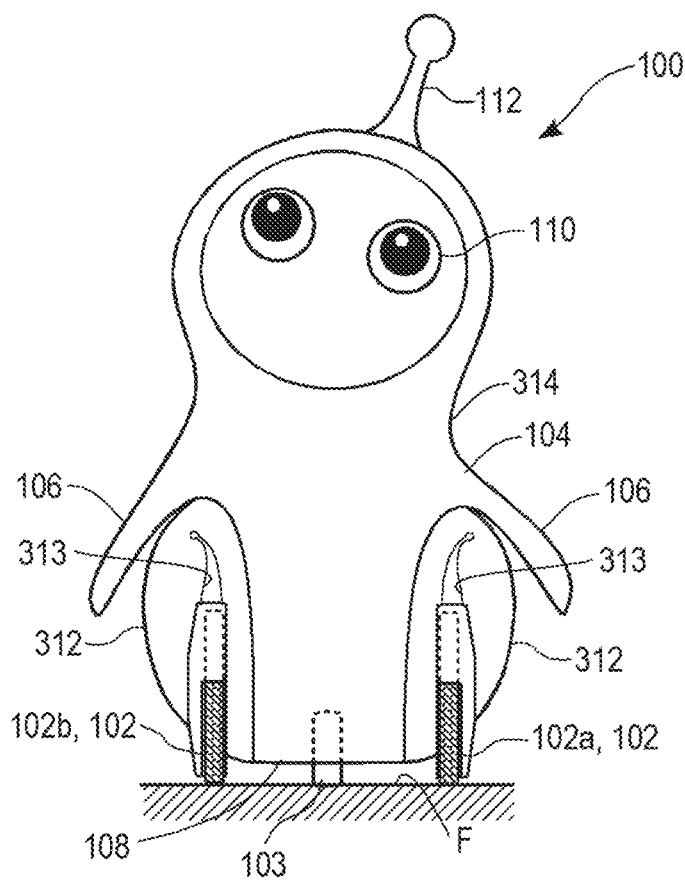
FIGS. 1A and 1B are drawings representing an external view of a robot according to an embodiment.

Hereafter, an embodiment of the invention will be described in detail, with reference to the drawings. For the sake of convenience, a positional relationship between structures may be expressed with a state shown in the drawings as a reference in the following description. Also, in the following embodiment and modifications thereof, the same reference signs are allotted to components that are practically identical, and a description thereof is omitted as appropriate.

A robot of the embodiment has a wheel as a movement mechanism, and has a structure such that the wheel can be housed in a body. That is, a cover is provided on a side face of a main body frame, and a closed space between the cover and the side face of the main body frame is adopted as a wheel housing space. As the cover has flexibility and elasticity, the cover is pushed apart when the wheel is caused to advance from the wheel housing space. When the wheel is caused to retreat into the wheel housing space, the cover returns to the original form thereof. This kind of flexible movement (transformation) of the cover is reminiscent of that of a region of an animal, and causes a user to feel the kind of familiarity felt toward a pet. Owing to the wheel being completely housed, the robot is easily picked up and hugged, and the user can be prevented from coming into contact with a grounding surface of the wheel. According to the embodiment, a robot such that consideration is given to a user in this way is provided. Hereafter, a specific configuration of this kind of robot will be described.

Figure 1B:
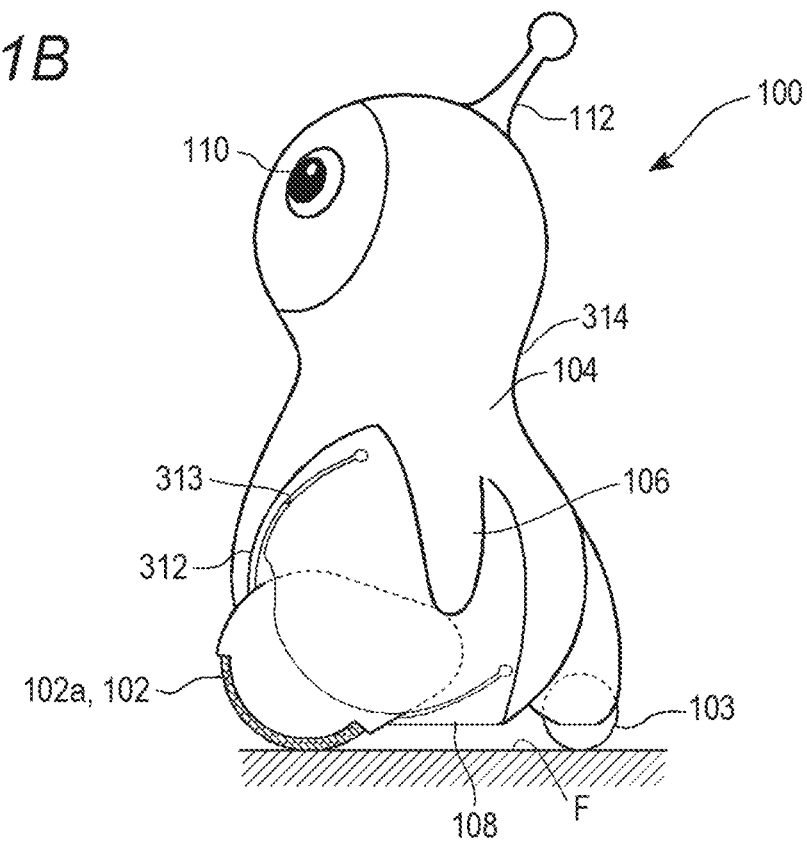

FIGS. 1A and 1B are drawings representing an external view of a robot 100 according to the embodiment. FIG. 1A is a front view, and FIG. 1B is a side view.

The robot 100 is an autonomously acting robot that determines an action or a gesture based on an external environment and an internal state. The external environment is recognized using various kinds of sensor, such as a camera or a thermosensor. The internal state is quantified as various parameters that express emotions of the robot 100. The robot 100 has an interior of an owner's home as an action range. Hereafter, a human involved with the robot 100 will be called a "user".

A body 104 of the robot 100 has a rounded form all over, and includes an outer skin 314 formed of a soft material having elasticity, such as urethane, rubber, a resin, or a textile. The robot 100 may be clothed. A total weight of the robot 100 is in the region of 5 to 15 kilograms, and a height is in the region of 0.5 to 1.2 meters. Owing to attributes of appropriate weight, roundness, softness, and a pleasant tactile sensation, advantages are realized in that a user can more easily embrace the robot 100, and feels an urge to embrace the robot 100.

The robot 100 includes a pair of front wheels 102 (a left front wheel 102a and a right front wheel 102b) and one rear wheel 103. The front wheels 102 are drive wheels, and the rear wheel 103 is a driven wheel. Although the front wheels 102 have no steering mechanism, rotational speeds and directions of rotation of the left and right wheels can be individually controlled. The rear wheel 103 is a caster, and rotates freely in order to cause the robot 100 to move forward and back, and left and right. The rear wheel 103 may also be an omni wheel. By controlling so that the rotational speed of the right front wheel 102b is greater than that of the left front wheel 102a, the robot 100 can turn left or rotate counterclockwise. By controlling so that the rotational speed of the left front wheel 102a is greater than that of the right front wheel 102b, the robot 100 can turn right or rotate clockwise.

The front wheels 102 and the rear wheel 103 can be completely housed in the body 104 using a drive mechanism (a pivoting mechanism and a linking mechanism) to be described hereafter. A left and right pair of covers 312 are provided in a lower half portion of the body 104, configure a soft trunk, and can house the front wheels 102. A slit 313 (an aperture portion) which is opened facing forward is formed in the cover 312, and the front wheel 102 can be caused to advance through the slit 313 and be exposed in an exterior. The cover 312 functions as a "body forming member", and a peripheral edge portion of the slit 313 functions as a "flexible region".

A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F. Details of a structure and an operation of a wheel housing mechanism will be described hereafter.

The robot 100 has two arms 106. The arm 106 does not have a function of gripping an object. The arm 106 is capable of performing simple actions such as raising, waving, and oscillating by pulling or relaxing an unshown incorporated wire. The two arms 106 can also be individually controlled.

Two eyes 110 are provided in a head portion front surface (a face) of the robot 100. The eye 110 is displayed expressing various emotions using a liquid crystal element or an organic EL element. The robot 100 incorporates a speaker, and is also capable of simple speech. A horn 112 is attached to an apex portion of the robot 100. A whole-sky camera is incorporated in the horn 112, and can film in all directions up and down and left and right at one time. Also, a high resolution camera (not shown) is provided in the head portion front surface of the robot 100.

In addition to this, the robot 100 incorporates various sensors, such as a temperature sensor that detects a peripheral temperature, a microphone array having a multiple of microphones, a form measuring sensor (depth sensor) that can measure a form of a measurement target, and an ultrasonic wave sensor.

Figure 2:
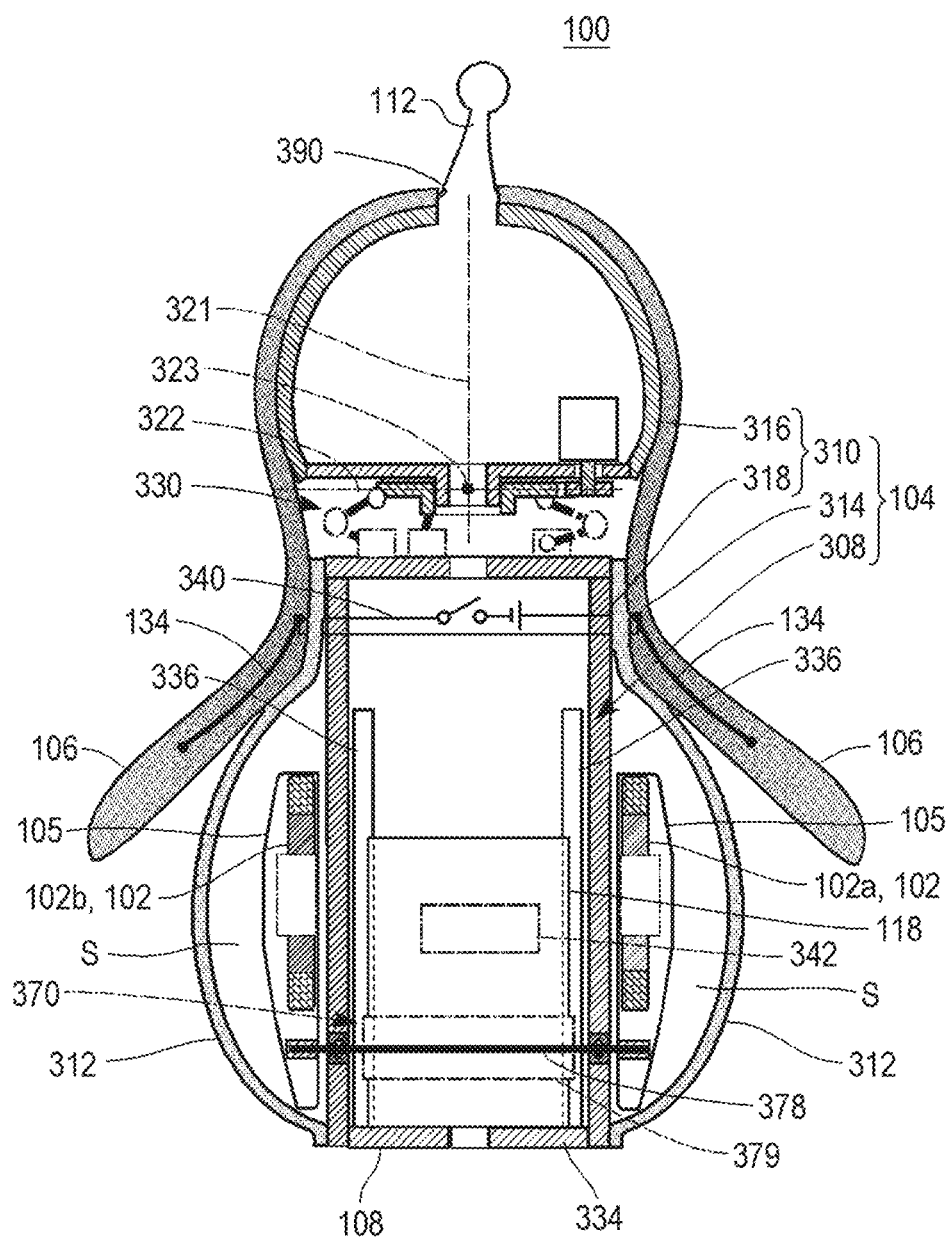
FIG. 2 is a sectional view schematically representing a structure of the robot.

FIG. 2 is a sectional view schematically representing a structure of the robot 100.

The body 104 includes a base frame 308, a main body frame 310, the outer skin 314, and the pair of covers 312. The base frame 308 supports an internal mechanism together with configuring a shaft of the body 104. The base frame 308 is configured by a multiple of side plates 336 being erected on a lower plate 334. A battery 118, a control circuit 342, and various kinds of actuator and the like are housed inside the base frame 308. A bottom face of the lower plate 334 forms the seating face 108.

The main body frame 310 includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. A lower end portion of the trunk portion frame 318 is fixed to the lower plate 334. The head portion frame 316 is connected to the trunk portion frame 318 via a connection mechanism 330.

The head portion frame 316 has a yaw shaft 321, a pitch shaft 322, and a roll shaft 323. A head shaking action is realized by a pivoting (yawing) around the yaw shaft 321 of the head portion frame 316, a nodding action, a looking up action, and a looking down action are realized by a pivoting (pitching) around the pitch shaft 322, and an action of tilting the head left and right is realized by a pivoting (rolling) around the roll shaft 323. A position and an angle of each shaft in a three-dimensional space can change in accordance with a driving aspect of the connection mechanism 330. The connection mechanism 330 is formed of a linking mechanism, and is driven by a multiple of motors installed in the trunk portion frame 318.

The trunk portion frame 318 houses the base frame 308 and a wheel drive mechanism 370. The wheel drive mechanism 370 includes a front wheel drive mechanism and a rear wheel drive mechanism that move the front wheels 102 and the rear wheel 103 respectively out of and into the body 104. The front wheels 102 and the rear wheel 103 function as a "movement mechanism" that causes the robot 100 to move. The front wheel 102 has a direct drive motor (hereafter referred to as a "DD motor") in a central portion thereof. Because of this, the left front wheel 102a and the right front wheel 102b can be driven individually. The front wheel 102 is supported so as to be able to rotate by a wheel cover 105, and the wheel cover 105 is supported so as to be able to rotate by the trunk portion frame 318.

The pair of covers 312 are provided so as to cover the trunk portion frame 318 from left and right, and are of a smooth, curved form so as to provide an outline of the body 104 with roundness. A closed space is formed between the trunk portion frame 318 and the cover 312, and the closed space forms a housing space S of the front wheel 102. The rear wheel 103 is housed in a housing space provided in a lower rear of the trunk portion frame 318.

The outer skin 314 covers the main body frame 310 from an outer side. The outer skin 314 has a thickness of an extent such that a person feels elasticity, and is formed of a material having elasticity, such as urethane sponge. Because of this, a user feels an appropriate softness when embracing the robot 100, and can enjoy a natural physical contact, as a person does with a pet. The outer skin 314 is mounted on the main body frame 310 in a way that causes the cover 312 to be exposed.

A touch sensor is installed between the main body frame 310 and the outer skin 314. A touch sensor is buried in the cover 312. Each of these touch sensors is a capacitive sensor, and detects a touch in practically any region of the robot 100. In a modification, a touch sensor may be buried in the outer skin 314, or may be disposed on an inner side of the main body frame 310.

The arm 106 is formed integrally with the outer skin 314. An aperture portion 390 is provided in an upper end portion of the outer skin 314. A lower end portion of the horn 112 is connected to the head portion frame 316 through the aperture portion 390.

A drive mechanism for driving the arm 106 includes a wire 134 buried in the outer skin 314 and a drive circuit 340 (energizing circuit) of the wire 134. The wire 134 is formed of a shape memory alloy line in the embodiment, contracts and hardens when heated, and relaxes and lengthens when allowed to cool. Leads drawn out from both ends of the wire 134 are connected to the drive circuit 340. When a switch of the drive circuit 340 is activated, the wire 134 (shape memory alloy line) is energized.

The wire 134 is molded or woven in so as to extend from the outer skin 314 to the arm 106. Leads are drawn from both ends of the wire 134 into the trunk portion frame 318. One wire 134 may be provided in each of a left and right of the outer skin 314, or a multiple of the wire 134 may be provided in parallel in each of the left and right of the outer skin 314. An arm (the arm 106) can be raised by energizing the wire 134, and the arm (arm 106) can be lowered by interrupting the energization.

Figure 3A:
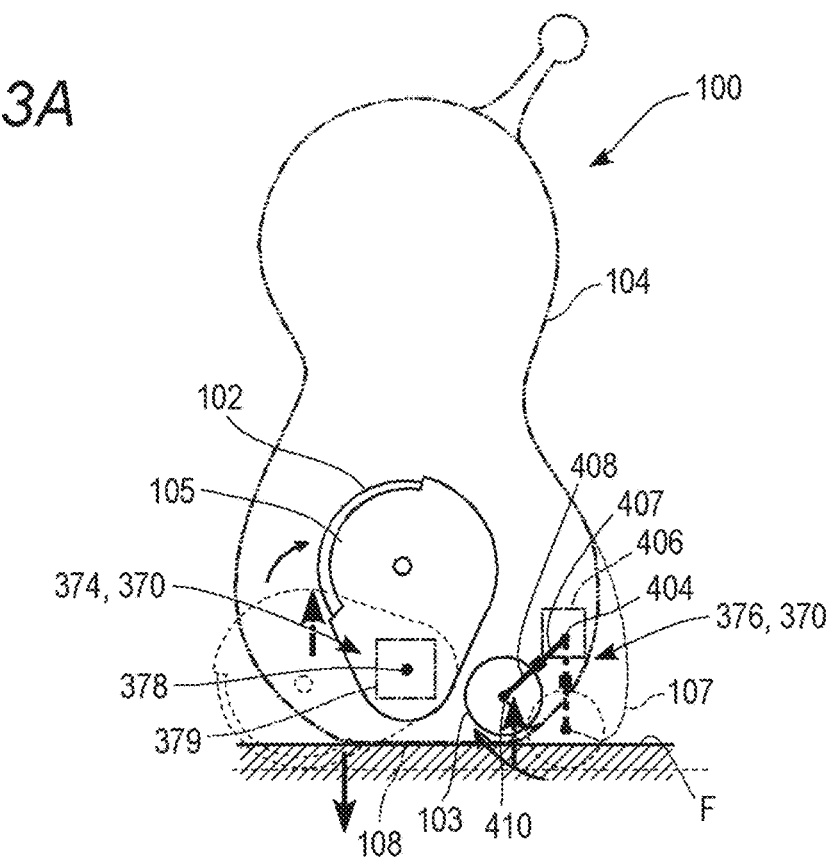
FIGS. 3A and 3B are drawings schematically showing a structure and an operation of a wheel housing mechanism.
Figure 3B:
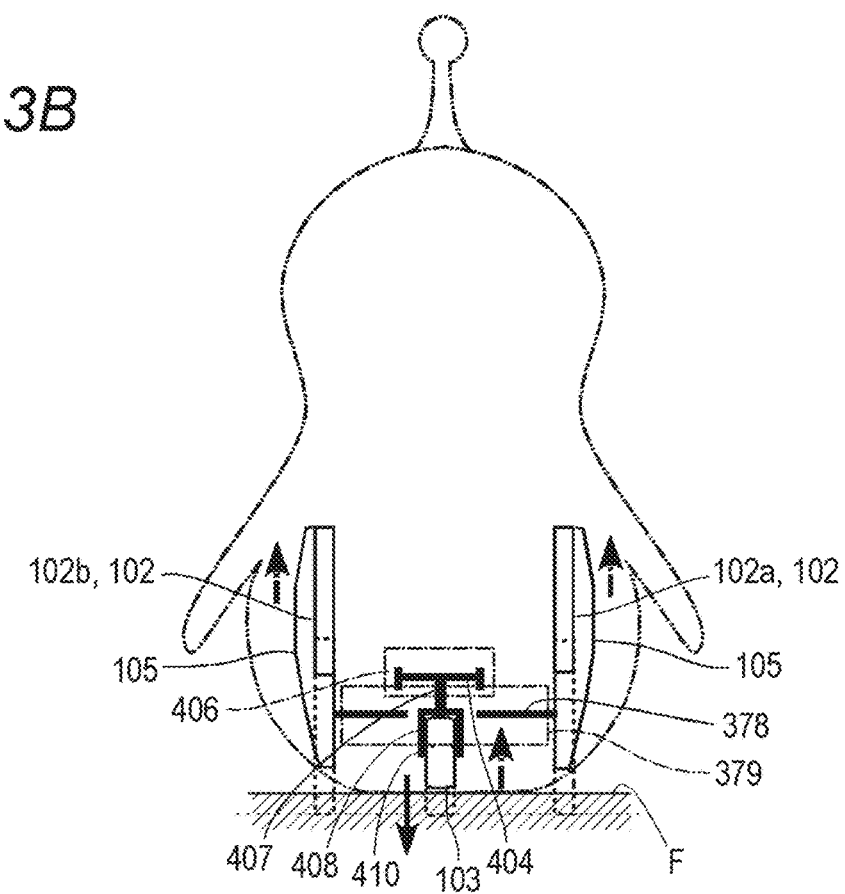

FIGS. 3A and 3B are drawings schematically showing a structure and an operation of a wheel housing mechanism. FIG. 3A is a side view, and FIG. 3B is a front view. A dotted line in the drawing shows a state wherein a wheel has advanced from the housing space S and can run, and a solid line in the drawing shows a state wherein a wheel is housed in the housing space S.

The wheel drive mechanism 370 includes a front wheel drive mechanism 374 and a rear wheel drive mechanism 376. The front wheel drive mechanism 374 includes a pivot shaft 378 and an actuator 379. The pivot shaft 378 is coupled to the wheel cover 105. In the embodiment, a motor is employed as the actuator 319. The front wheel 102 can be driven to reciprocate between the housing space S and the exterior by causing the wheel cover 105 to pivot using a drive of the actuator 379. In this way, the front wheel drive mechanism 374 functions as a "pivoting mechanism".

The rear wheel drive mechanism 376 includes a pivot shaft 404 and an actuator 406. A rotary shaft 407 is supported in a center of the pivot shaft 404. A forked arm 408 extends from the rotary shaft 407, and an axle 410 is provided integrated with a leading end of the arm 408. The rear wheel 103 is supported so as to be able to rotate by the axle 410. The rotary shaft 407 rotates freely around its own axis, and causes an orientation (direction of travel) of the rear wheel 103 to change arbitrarily. The rear wheel 103 can be driven to reciprocate between a rear housing space and the exterior by a drive of the actuator 406. In this way, the rear wheel drive mechanism 376 functions as a "linking mechanism".

When housing the wheels, the actuators 379 and 406 are driven in one direction. At this time, the wheel cover 105 pivots centered on the pivot shaft 378, and the front wheel 102 rises from the floor surface F. Also, the arm 408 pivots centered on the pivot shaft 404, and the rear wheel 103 rises from the floor surface F (refer to a dotted chain line arrow). Because of this, the body 104 descends, and the seating face 108 is grounded on the floor surface F (refer to a solid arrow). Because of this, a state in which the robot 100 is sitting is realized. By the actuators 379 and 406 being driven in the opposite direction, each wheel is caused to advance, whereby the robot 100 can be caused to stand.

A rear cover 10/resembling a tail is provided on an outer side of the rear wheel 103, and opens and closes a rear lower aperture portion of the body 104 in conjunction with the rear wheel 103. That is, the rear cover 107 performs an opening operation when causing the rear wheel 103 to advance, and the rear cover 107 performs a closing operation when housing the rear wheel 103.

Figure 4:
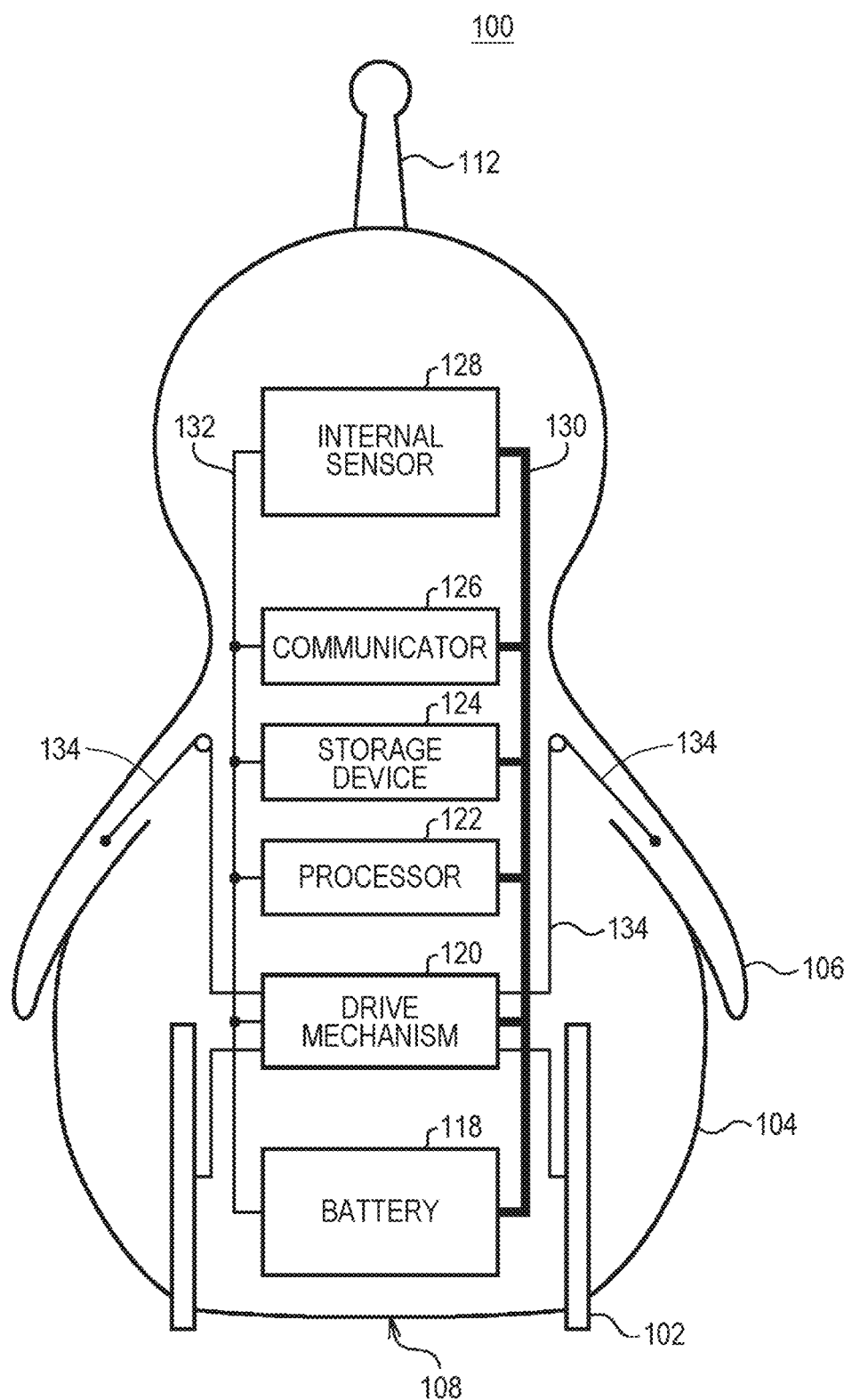
FIG. 4 is a hardware configuration diagram of the robot.

FIG. 4 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described connection mechanism 330 and wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera (a whole-sky camera, a high resolution camera), a microphone array, a distance sensor (infrared sensor), a thermosensor, a touch sensor, an acceleration sensor, a smell sensor, and the like. The touch sensor corresponds to a greater portion of regions of the body 104, and detects a touch by a user based on a change in capacitance. The smell sensor is an already known sensor that applies a principle that electrical resistance changes in accordance with an adsorption of molecules that form a source of a smell.

The communicator 126 is a communication module that carries out wireless communication with a server 200, to be described hereafter, and various kinds of external device, such as an external sensor 114 or a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls the internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls a wheel (the front wheel 102) and a head portion (the head portion frame 316). The drive mechanism 120 causes a direction of movement and a movement speed of the robot 100 to change by causing the rotational speed and the direction of rotation of each of the two front wheels 102 to change. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state. Also, the drive mechanism 120 controls the arm 106 via the wire 134.

Figure 5:
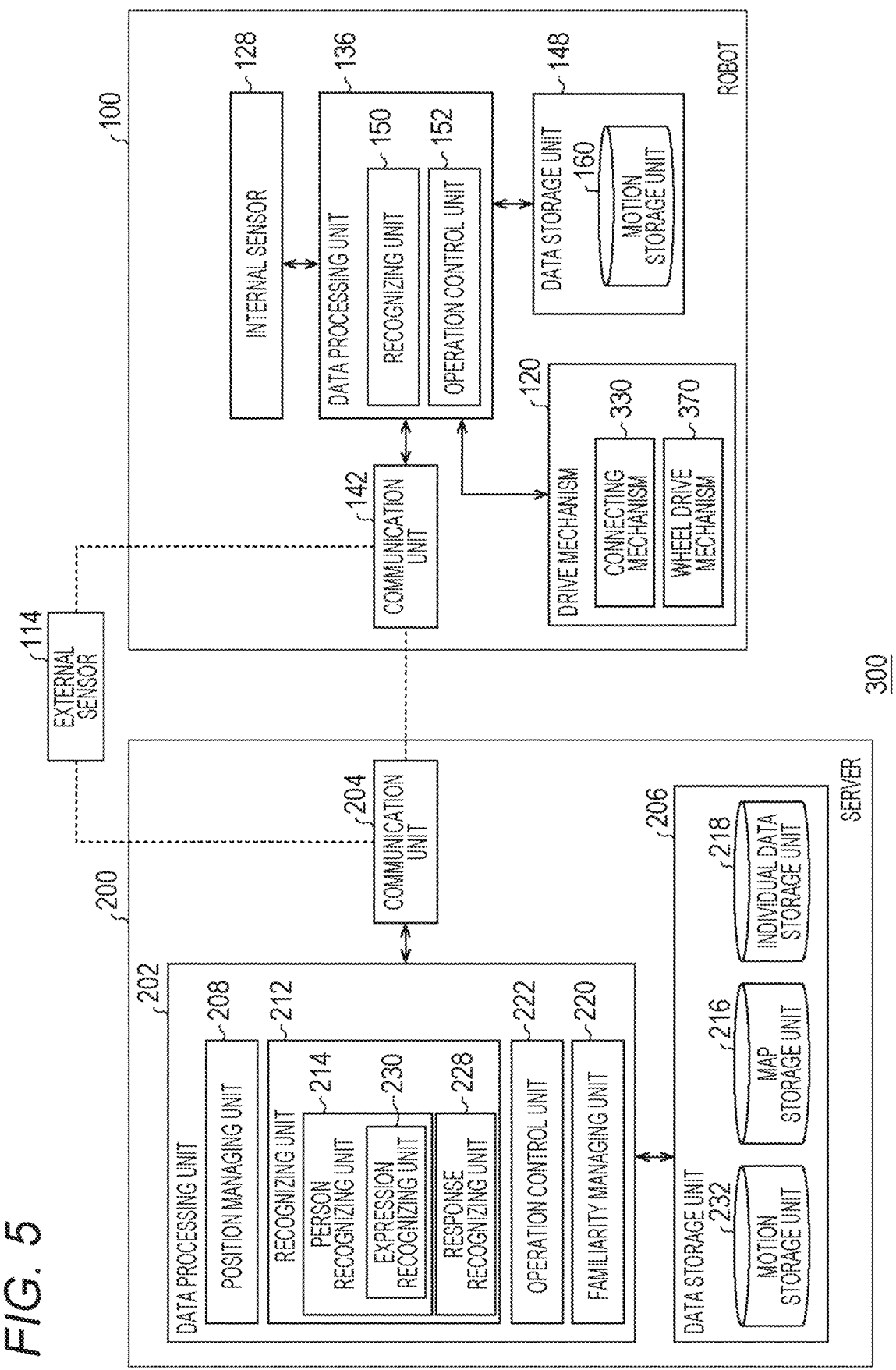
FIG. 5 is a functional block diagram of the robot system.

FIG. 5 is a functional block diagram of a robot system 300.

The robot system 300 includes the robot 100, the server 200, and the multiple of external sensors 114. Each component of the robot 100 and the server 200 is realized by hardware including a computer formed of a central processing unit (CPU), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

The multiple of external sensors 114 are installed in advance in a house. Positional coordinates of the external sensor 114 are registered in the server 200. The server 200 determines a basic action of the robot 100 based on information obtained from the internal sensor 128 of the robot 100 and the multiple of external sensors 114. The external sensor 114 is for reinforcing a sensory organ of the robot 100, and the server 200 is for reinforcing a processing capacity of the robot 100. The communicator 126 of the robot 100 communicates regularly with the external sensor 114, and the server 200 identifies a position of the robot 100 using the external sensor 114.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving the arm 106, approaching a user while meandering, and staring at a user with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100. Many motions of the robot 100 are configured as compound motions that include a multiple of unit motions.

In addition to an action map that defines a robot action in accordance with a situation, the map storage unit 216 also stores a map showing a disposition state of an obstacle such as a chair or a table. The individual data storage unit 218 stores information on a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has an internal parameter of familiarity for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognizing unit 212, an operation control unit 222, and a familiarity managing unit 220. The position managing unit 208 identifies the positional coordinates of the robot 100. The position managing unit 208 may also track positional coordinates of a user in real time.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. A recognizing unit 150 of the robot 100 acquires various kinds of environmental information using the internal sensor 128, and transmits the environmental information to the recognizing unit 212 of the server 200 after carrying out a primary processing.

The recognizing unit 212 further includes a person recognizing unit 214 and a response recognizing unit 228. The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user.

The response recognizing unit 228 recognizes various responsive actions performed with respect to the robot 100, and classifies the actions as pleasant or unpleasant actions. Also, the response recognizing unit 228 recognizes a responsive action of a user with respect to an action of the robot 100, thereby classifying the responsive action as a positive or negative response. Pleasant and unpleasant actions are distinguished depending on whether a responsive action of a user is pleasant or unpleasant for an animal.

The operation control unit 222 determines a motion of the robot 100 in cooperation with an operation control unit 152 of the robot 100. The operation control unit 222 compiles a movement target point of the robot 100, and a movement route for the movement target point. The operation control unit 222 compiles a multiple of movement routes, and having done so, may select any of the movement routes. The operation control unit 222 selects a motion of the robot 100 from a multiple of motions of the motion storage unit 232.

The familiarity managing unit 220 manages familiarity for each user. Familiarity is registered as one portion of individual data in the individual data storage unit 218. When a pleasant action is detected, the familiarity managing unit 220 increases familiarity with respect to that user. When an unpleasant action is detected, familiarity decreases. Also, familiarity of a user who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 4), and manages a process of communicating with the external sensor 114, the server 200, and another robot 100. The data storage unit 148 stores various kinds of data. The data storage unit 148 corresponds to the storage device 124 (refer to FIG. 4). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions.

Various kinds of data may also be downloaded from the map storage unit 216 and the individual data storage unit 218 into the data storage unit 148.

The data processing unit 136 includes the recognizing unit 150 and the operation control unit 152. The recognizing unit 150 analyzes external information obtained from the internal sensor 128. The recognizing unit 150 is capable of visual recognition (a visual unit), smell recognition (an olfactory unit), sound recognition (an aural unit), and tactile recognition (a tactile unit).

The recognizing unit 150 regularly films an exterior using the incorporated whole-sky camera, and detects a moving object such as a person or a pet. The recognizing unit 150 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from a smell sensor, an incorporated highly directional microphone, a temperature sensor, and the like. These characteristics are also quantified, forming a feature vector component.

The familiarity managing unit 220 of the server 200 changes the familiarity toward a user in accordance with a responsive action recognized by the recognizing unit 150. In principle, the familiarity toward a user who carries out a pleasant action increases, while the familiarity toward a user who carries out an unpleasant action decreases.

The operation control unit 152 decides a direction of movement of the robot 100 together with the operation control unit 222 of the server 200. A movement based on an action map may be determined by the server 200, and an instantaneous movement such as avoiding an obstacle may be determined by the robot 100. The drive mechanism 120 causes the robot 100 to head toward a movement target point by driving the front wheels 102 (the wheel drive mechanism 370) in accordance with an instruction from the operation control unit 152.

The operation control unit 152 decides a motion of the robot 100 in cooperation with the operation control unit 222 of the server 200. One portion of motions may be determined by the server 200, and other motions may be determined by the robot 100. Also, a configuration may be such that although the robot 100 determines a motion, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 152 instructs the drive mechanism 120 to execute a selected motion. The drive mechanism 120 controls each actuator in accordance with a motion file. When a head portion operation, or a wheel advancing/retreating operation, is defined in a motion file, the operation control unit 152 executes control of the operation by driving the drive mechanism 120.

The operation control unit 152 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and the head (the head portion frame 316) in accordance with an instruction from the operation control unit 152.

Next, a characteristic configuration and an operation of the robot 100 will be described.

Figure 6A:
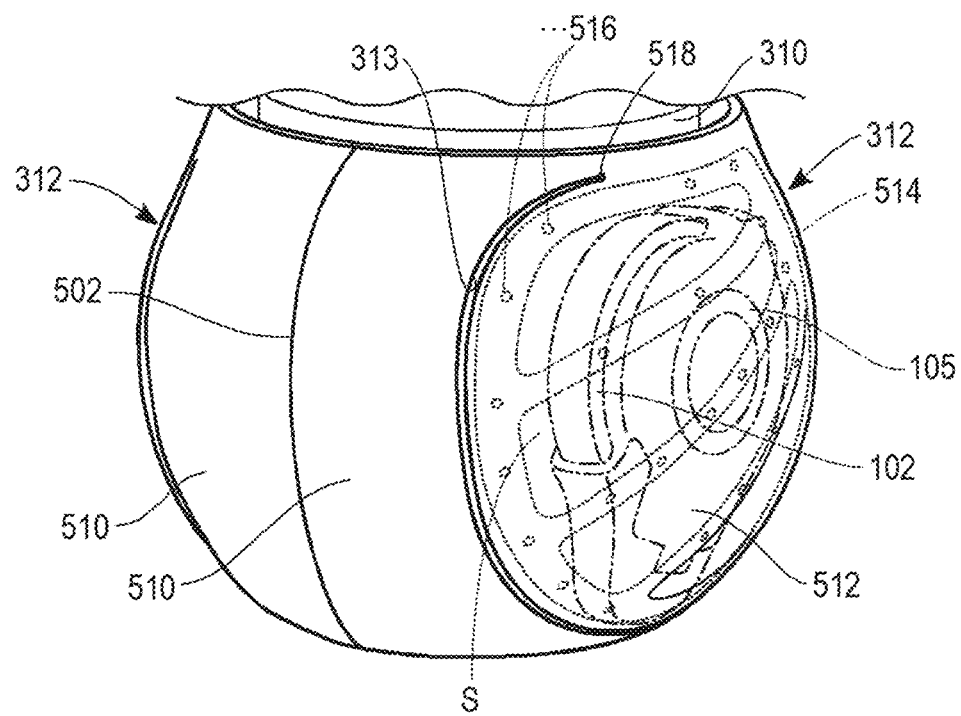
FIGS. 6A and 6B are drawings representing a structure and an operation of the wheel housing mechanism.
Figure 6B:
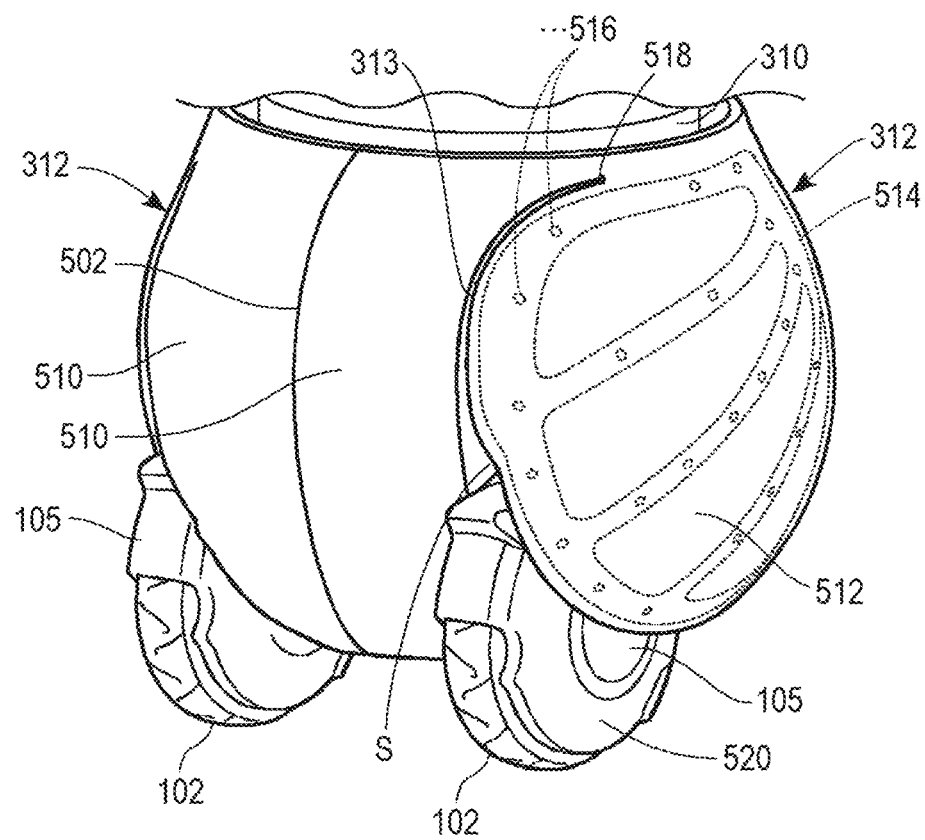
Figure 7:
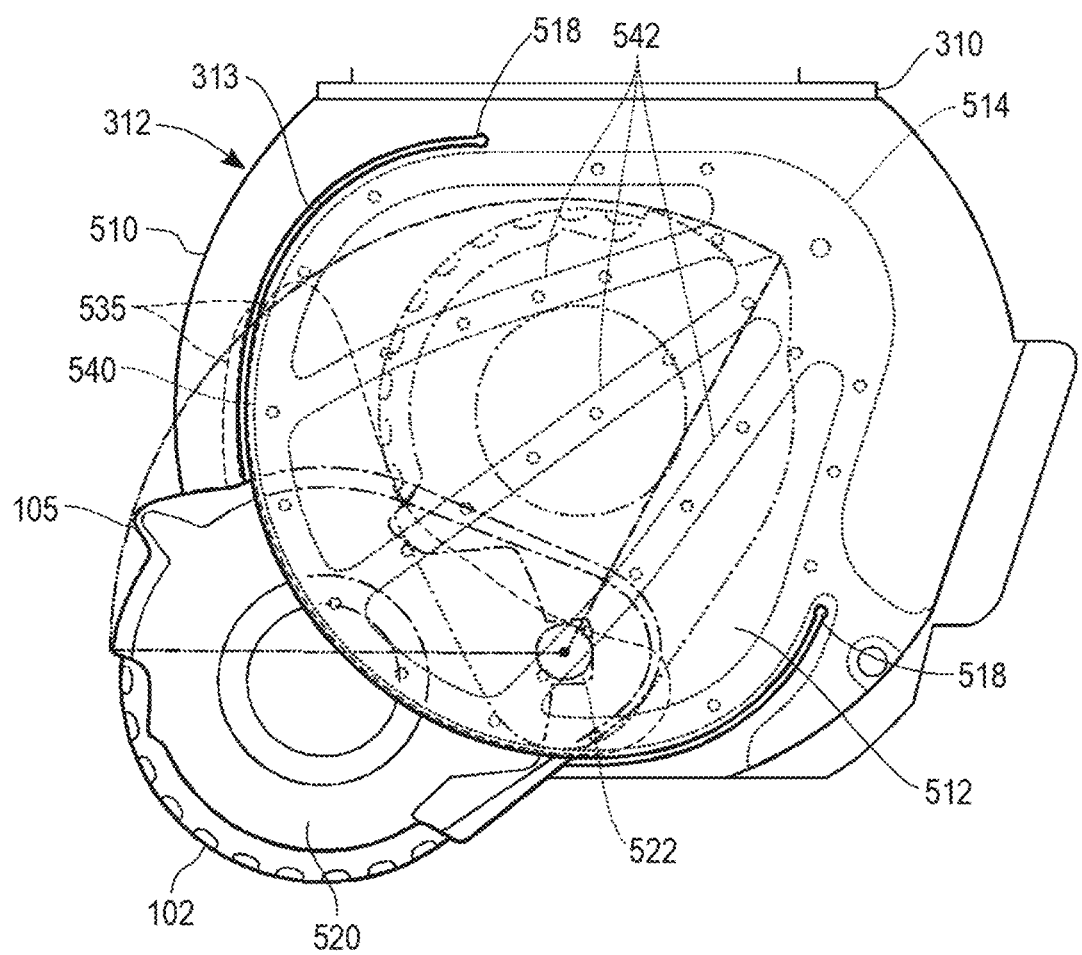
FIG. 7 is a side view showing a state wherein a wheel has advanced.
Figure 8A:
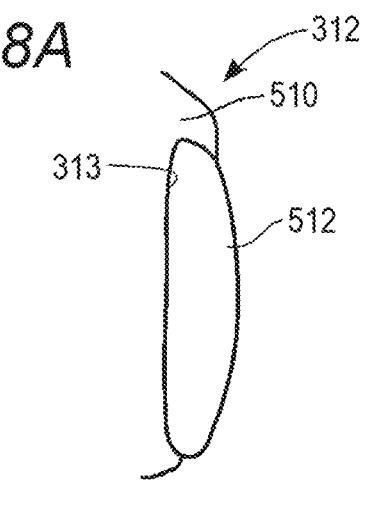
FIGS. 8A to 8F are drawings representing a structure and an operation of the wheel housing mechanism.
Figure 8D:
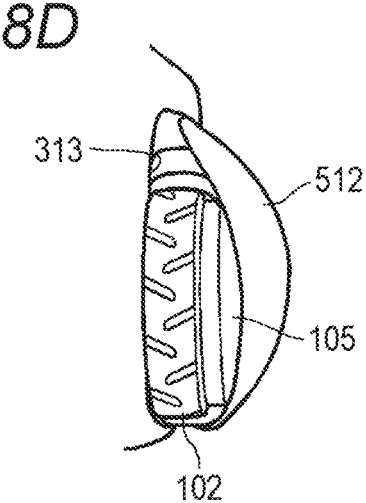
Figure 8B:
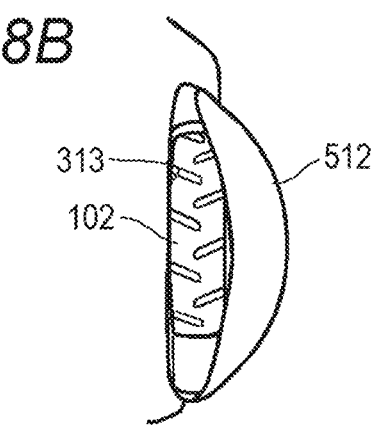
Figure 8E:
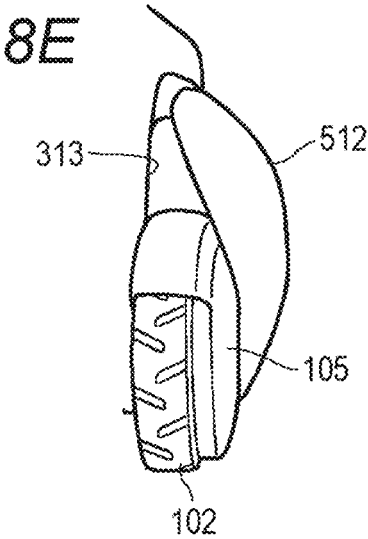
Figure 8C:
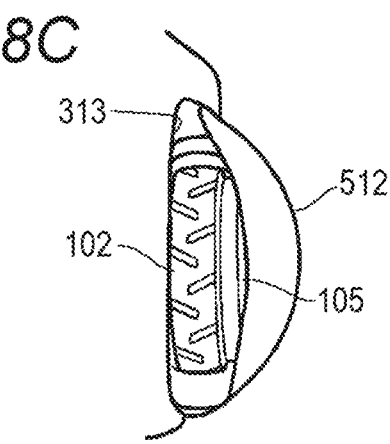
Figure 8F:
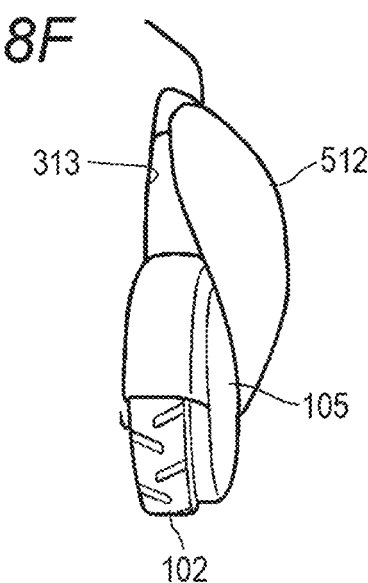

FIGS. 6A to 8F are drawings representing a structure and an operation of the wheel housing mechanism. FIGS. 6A to 6B are perspective views showing a lower half portion of the robot 100 in a state wherein the outer skin 314 has been omitted. FIG. 6A shows a state wherein a wheel is housed, and FIG. 6B shows a state wherein a wheel has advanced. FIG. 7 is a side view showing a state wherein a wheel has advanced. FIGS. 8A to 8F are partial enlarged views of a wheel advancing operation seen from a front side. FIGS. 8A to 8F show a wheel advancing process.

As shown in FIG. 6A, the pair of covers 312 are configured to have bilateral symmetry with respect to the main body frame 310, and are joined at a front face and a rear face thereof (a joint portion 502). The covers 312 form the body 104 together with the main body frame 310. Although the joining of the two covers is carried out by welding or bonding in this embodiment, fastening by screwing, or another fixing method, may be employed. The cover 312 is formed of a resin material having flexibility and elasticity (rubber, silicon rubber, or the like in this embodiment). The vertical slit 313 is provided from a side face to a front face of the cover 312. The slit 313 is of an arc form (fan form) as seen from a side of the body 104.

The cover 312 has a mounted portion 510 on an inner side and a bulging portion 512 on an outer side, with the slit 313 as a boundary. The mounted portion 510 is fixed to the main body frame 310. The bulging portion 512 has a form that bulges in a direction away from the main body frame 310, forming a closed space between the bulging portion 512 and the main body frame 310. A spring member 514 is buried (insert molded) in the bulging portion 512, coinciding with the form thereof. The spring member 514 is obtained by a metal plate (a spring steel plate) being punched out into a framework form using a sheet metal processing, then being molded into a curved form. The cover 312 is obtained by the spring member 514 being positioned in a predetermined die, and injection molding of a resin material being carried out. A chamber of the die also has a curved portion that coincides with the form of the cover 312. The spring member 514 functions as a core member of the cover 312, and configures an "elastic body" together with the resin material (rubber).

A multiple of small holes 516 are formed at predetermined intervals over a whole length of the spring member 514. Stabilizing of a joint between the spring member 514 and the resin material is achieved by arranging so that the resin material can flow over a front and rear of the spring member 514 through the small holes 516 when carrying out injection molding. A circular hole 518 is provided at both ends (upper and lower ends) of the slit 313 (refer to FIG. 7), whereby stress concentration at an end portion when the slit 313 is pushed a part is alleviated, and breakage of the cover 312 is prevented.

The slit 313 is in a closed state in a state in which a wheel is housed, as shown in the drawing. The front wheel 102 is completely housed inside the cover 312. The housing space S inside the cover 312 has a size of an extent such that the wheel cover 105 integrated with the front wheel 102 fits inside exactly.

When the wheel drive shown in FIG. 6B is carried out, the front wheel 102 protrudes from the slit 313, attaining an aspect of being exposed in the exterior of the cover 312. In a process of the front wheel 102 advancing the wheel cover 105 attains an aspect of causing the bulging portion 512 to be pushed to an outer side. Owing to the elasticity and flexibility of the cover 312, the cover 312 bends centered on a portion reached by the wheel cover 105, as shown in the drawing, and a portion passed by the wheel cover 105 attains an aspect of elastically recovering to the original form. That is, a transformed region of the slit 313 changes in the process of the front wheel 102 advancing. When housing the wheel, a wheel operation the reverse of that described above is carried out.

As shown in the drawing, a greater portion of the front wheel 102, excepting the grounding surface thereof, is covered by the wheel cover 105. As a gap between the wheel cover 105 and the front wheel 102 is extremely small, a peripheral object being drawn in or caught up is prevented. Owing to a place that comes into contact with the slit 313 portion of the cover 312 being the wheel cover 105 rather than the front wheel 102 itself, the cover 312 is prevented from being dirtied when the front wheel 102 is moved in and out.

A tapered face 520 that inclines so as to approach an outer face of the front wheel 102 as the tapered face 520 heads toward a radial direction outer side of the front wheel 102 is provided on an outer face of the wheel cover 105. When the wheel advances, the outer face of the wheel cover 105 comes into contact with the slit 313. At this time, the slit 313 can be pushed smoothly apart along the tapered face 520, and movement in and out of the front wheel 102 is carried out smoothly.

Also, owing to the tapered face 520 being provided, the wheel cover 105 has an outer face of a form that complements an inner face of the bulging portion 512. This means that even when external pressure acts on the bulging portion 512 in the housed wheel state shown in FIG. 6A, deformation of the bulging portion 512 can be prevented or restricted by the bulging portion 512 being supported from the inner side by the wheel cover 105. For example, when a user embraces the robot 100, there is concern that the bulging portion 512 will undergo an elastic deformation due to the strength of the embrace. In this kind of case too, excessive deformation or crushing of the bulging portion 512 can be prevented by the wheel cover 105, which is a rigid body, functioning as a core member.

As shown in FIG. 7, the wheel cover 105 pivots centered on a rotary shaft 522 provided in a vicinity of a bottom portion of the main body frame 310. The slit 313 is provided on a track of the front wheel 102 in the cover 312 (refer to a two-dotted chain line). A sliding member 535 is provided on an inner side of the cover 312 (more specifically, inner faces of the mounted portion 510 and the bulging portion 512 in a vicinity of the slit 313). The sliding member 535 is a sheet form member formed of a resin with high abrasion resistance (for example, polyacetal (POM)), and is disposed in a portion that comes into contact with the wheel cover 105 in the vicinity of the slit 313. The sliding member 535 comes into contact with, and smoothly guides, the wheel cover 105 when the front wheel 102 is driven so as to advance or retreat, whereby abrasion (deterioration) of the cover 312 can be prevented or restricted.

The spring member 514 has an annular base portion 540 coinciding with a vicinity of a peripheral edge of the bulging portion 512, and a multiple of frame forming portions 542 spanning the base portion 540 in a radial direction, wherein a framework structure is formed of the base portion 540 and the frame forming portions 542. By securing an appropriate interval between the base portion 540 and the frame forming portion 542, and between neighboring frame forming portions 542, and filling the intervals with a resin material (in other words, by setting the spring member 514 to an appropriate form, thickness, and width), an appropriate elasticity is obtained for the whole bulging portion 512. The base portion 540 extends along a vicinity of the slit 313.

The spring member 514 also functions as an electrode of a capacitive sensor (proximity sensor). When a user touches the cover 312 when lifting and hugging the robot 100, or the like, capacitance in a periphery of the electrode changes. A touch by a user can be determined to have occurred by the change being detected. By the spring member 514 being disposed over the whole of the cover 312 coinciding with the trunk portion of the robot 100 in this way, thereby securing a large area as a sensor electrode, sensitivity of the touch sensor can be increased.

When a wheel drive is carried out, the front wheel 102 is gradually pushed out from the cover 312 as in FIGS. 8A to 8F sequentially, with a greater portion thereof eventually being exposed in the exterior. Conversely, when housing the wheel, the front wheel 102 is gradually drawn into the cover 312 as in FIGS. 8F to 8A sequentially, eventually being completely housed. At this time, the slit 313 closes. The bulging portion 512 has a three-dimensional curved form like a bowl, but the curved form changes in the process of causing a wheel to advance and in the process of causing a wheel to retreat, as in the drawings. This kind of behavior when a wheel advances or retreats is such that the front wheel 102 attains an aspect of being flexibly moved in and out of the cover 312, providing a user with a sensation of animal-like flexibility and warmth.

FIGS. 9A to 9C are drawings schematically representing a method of assembling the body 104. FIGS. 9A to 9C show a process of the assembly.

In the body 104 assembly process, the main body frame 310, an internal mechanism thereof, and the like, are assembled, as shown in FIG. 9A. The front wheel 102 and the wheel cover 105 are positioned in a retreated state (a housed state).

Continuing, the pair of covers 312 are attached to the left and right of the main body frame 310 and fixed, as shown in FIG. 9B. Although a description has been omitted above, a multiple of reinforcement ribs 526 are provided in positions that do not interfere with the front wheel 102 on the inner face of the cover 312, whereby attachment of the cover 312 can be carried out stably and smoothly.

Continuing, the outer skin 314 is put on from the head portion side, as shown in FIG. 9C. A circular aperture portion 528 for exposing a face region of the head portion frame 316 is provided in an upper front face of the outer skin 314. The outer skin 314 extends on a front side and a back side of the robot 100, wherein extending portions 530 are configured so as not to interfere with the slit 313.

Heretofore, the robot 100 has been described based on an embodiment. According to the embodiment, the cover 312 undergoes an elastic transformation owing to a pressing force received in accompaniment to an advancing of the front wheel 102, increasing the size of the slit 313, and elastically recovers in accompaniment to a retreat of the front wheel 102, reducing the size of the slit 313. A transformed aspect of the slit 313 is also reminiscent of movement of a flexible region of a living being. Because of this, the robot 100 can be provided with an appearance of being alive and an appearance of intimacy like those of a pet. By the wheels being completely housed, the wheels can be prevented from interfering, and clothing from being dirtied, when a user lifts and hugs the robot 100, whereby consideration toward the user is achieved.

The invention not being limited to the heretofore described embodiment and modification, a constituent component can be modified and embodied without departing from the scope of the invention. Various inventions may be formed by a multiple of constituent components disclosed in the heretofore described embodiment and modification being combined as appropriate. Also, some constituent components may be deleted from the total of constituent components shown in the heretofore described embodiment and modification.

Figure 10A:
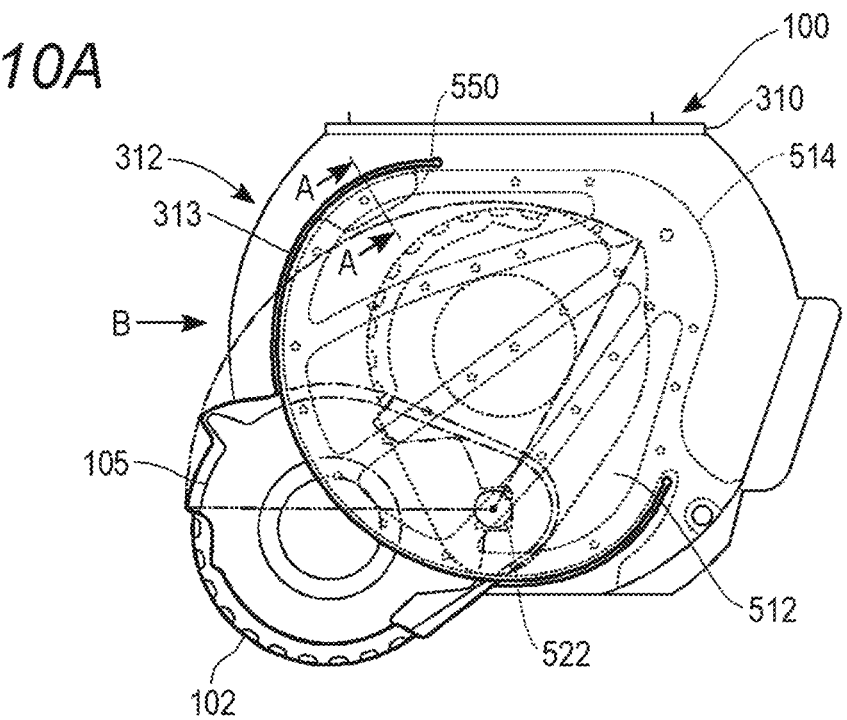
FIGS. 10A to 10C are drawings representing a wheel housing structure according to a first modification.
Figure 10B:
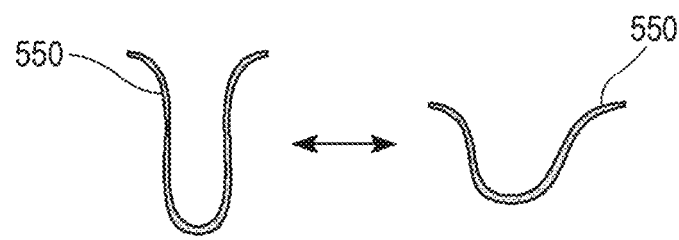
Figure 10C:
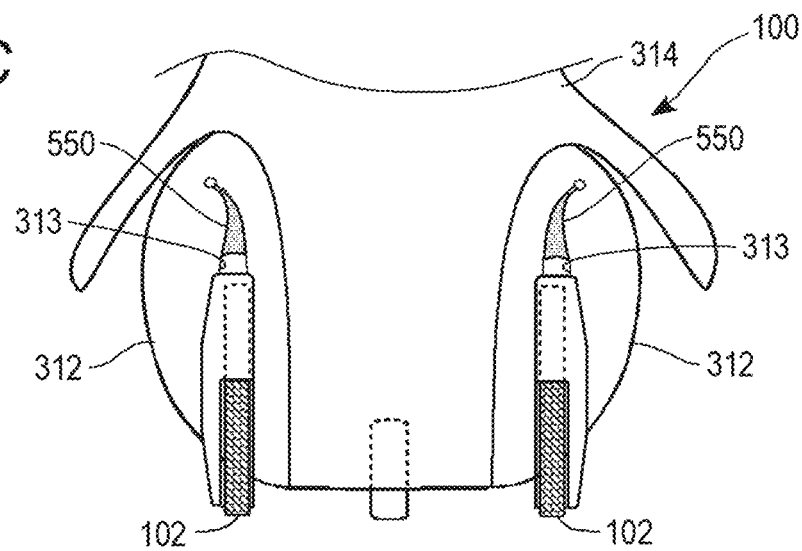

FIGS. 10A to 10C are drawings representing a wheel housing structure according to a first modification. FIG. 10A is a side view representing a structure of a wheel housing unit and a periphery thereof. FIG. 10B is a sectional view seen along an A-A arrow of FIG. 10A. FIG. 10C is a B direction arrow view (a front view) of FIG. 10A.

In this modification, as shown in FIG. 10A, a blocking portion 550 is provided in a position that does not interfere with the track of the front wheel 102 and the wheel cover 105 in a vicinity of an upper edge portion of the slit 313. The blocking portion 550 is formed of a flexible resin material, and has the kind of pleat structure shown in FIG. 10B. An opened end of the pleat structure is integrated with the aperture portion of the slit 313, and a folded portion is disposed inside the slit 313. When the slit 313 is pushed apart when a wheel advances, and when the slit 313 is drawn back when housing a wheel, the pleat structure changes between a standard state on the left side of FIG. 10B and an expanded state on the right side of FIG. 10B.

According to this kind of configuration, an internal structure (a mechanical structure portion) can be hidden when seen from the front of the robot 100, as shown in FIG. 10C. That is, a user can be prevented from losing interest due to glimpsing the mechanical structure portion when a wheel advances. Also, when a user such as a misbehaving small child attempts to push the slit 313 a part too far, the pleat structure becomes a stopper in the expanded state, and damage to the cover 312 can be prevented.

FIGS. 11A to 11C are drawings representing a wheel housing structure according to a second modification. FIG. 11A is a drawing representing a state in which the wheel is housed in a state wherein the outer skin 314 has been omitted. FIG. 11B is a drawing representing a state in which the wheel has advanced in a state wherein the outer skin 314 has been omitted. FIG. 11C is a drawing representing a state in which the wheel has advanced in a state wherein the outer skin 314 is mounted.

In this modification, a cover 612 is the same as the cover 312 except that the cover 612 does not have the kind of slit 313 of the embodiment, as shown in FIGS. 11A and 11B. In a state in which the wheel is housed, an inner peripheral portion of the cover 612 comes into contact with a side face of the trunk portion frame 318, forming the housing space S inside the cover 612. When the front wheel 102 advances when a wheel drive is carried out, the wheel cover 105 pushes through a gap between the trunk portion frame 318 and the cover 612. At this time, a lower portion of the cover 612 is pushed to an outer side, and an aperture portion 613 is formed between the side face of the trunk portion frame 318 and the cover 612. As shown in FIG. 11C, the outer skin 314 does not interfere with the aperture portion 613. The cover 612 functions as a "body forming member", and a lower inner edge portion thereof functions as a "flexible region".

According to this kind of configuration too, the cover 612 undergoes an elastic transformation (bends) owing to a pressing force from the wheel cover 105 accompanying an advancing of the front wheel 102, thereby increasing the size of the aperture portion 613. When the aperture portion 613 is pushed apart, the cover 612 generates a biasing force in a direction closing the aperture portion 613, and elastically recovers in accompaniment to a retreat of the front wheel 102, thereby closing the aperture portion 613. As a result of this, the same advantage as in the embodiment can be obtained.

Figure 12A:
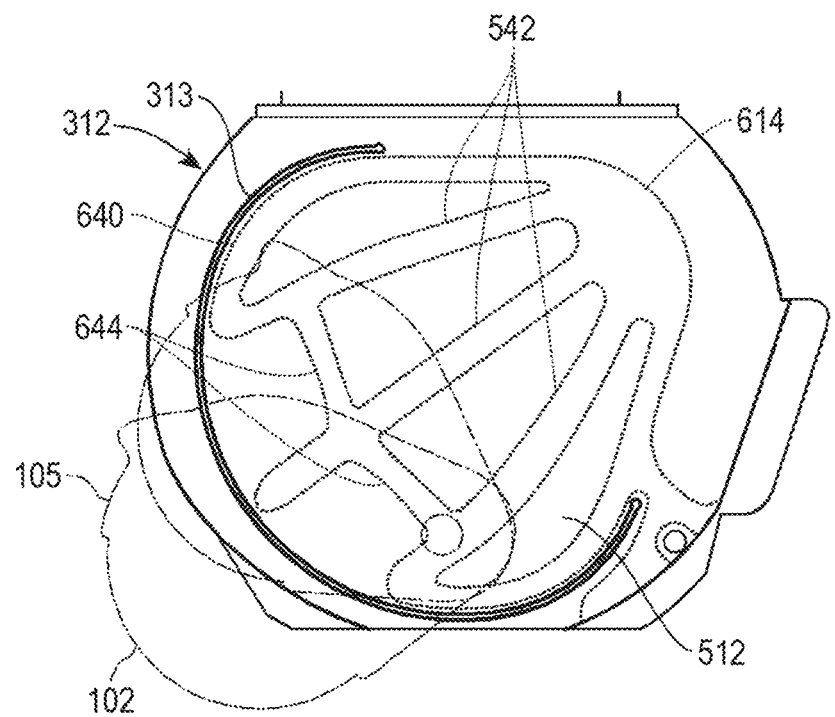
FIGS. 12A and 12B are side views representing wheel housing structures according to third and fourth modifications.
Figure 12B:
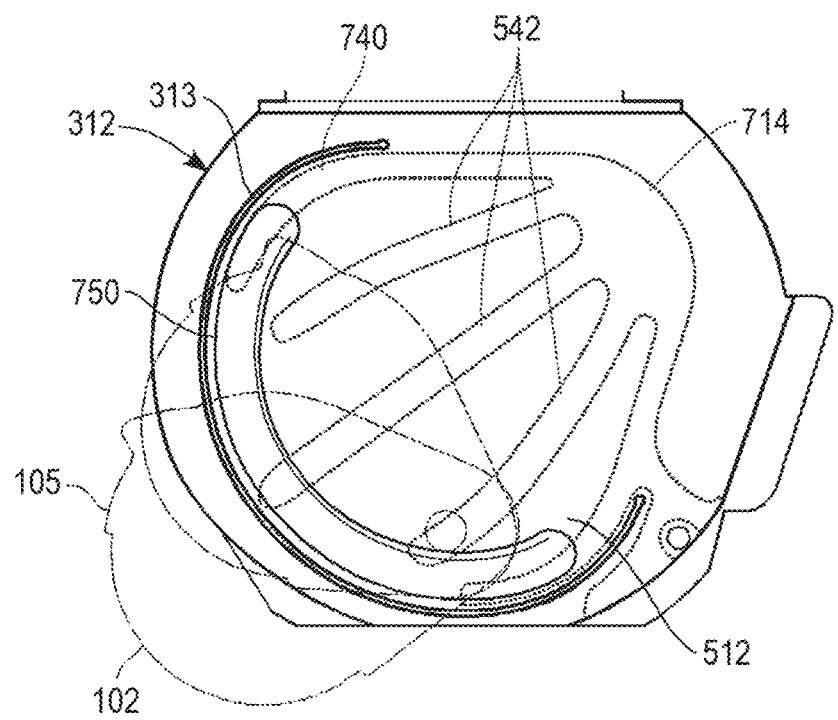

FIGS. 12A and 12B are side views representing wheel housing structures according to third and fourth modifications.

In the third and fourth modifications, a form of a spring member differs from that of the spring member 514 of the embodiment. In the third modification shown in FIG. 12A, a portion 644 coinciding with the track of the front wheel 102 in a base portion 640 of a spring member 614 is configured so as to be relatively distanced from the slit 313. Because of this, a portion pushed apart by the wheel cover 105 in a peripheral edge portion of the bulging portion 512 is easily bent. According to this kind of configuration, a place in the slit 313 that expands when a wheel advances is more limited, and a configuration such that the internal structure is difficult to see from the exterior can be adopted.

In the fourth modification shown in FIG. 12B, a portion coinciding with the track of the front wheel 102 in a base portion 740 of a spring member 714 is partially missing.

Because of this, a portion pushed apart by the wheel cover 105 in a peripheral edge portion of the bulging portion 512 is easily bent, in the same way as in the third modification. Furthermore, an arc form tactile sensation forming portion 750 is provided on an outer face of the bulging portion 512 in a vicinity of a peripheral edge coinciding with the track of the front wheel 102. The tactile sensation forming portion 750 forms a soft region softer than other regions of the bulging portion 512, providing a user with a pleasant tactile sensation.

Figure 13:
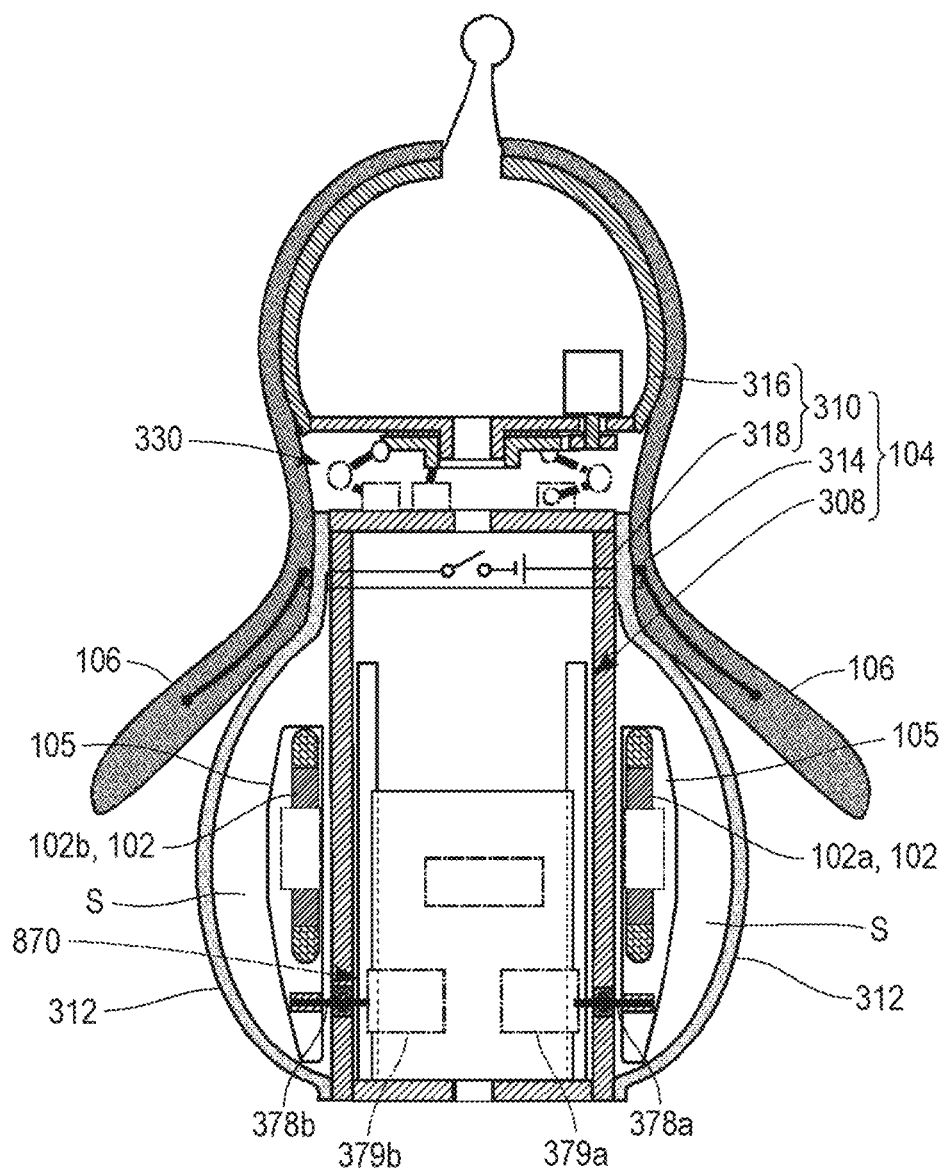
FIG. 13 is a drawing representing a wheel housing structure according to a fifth modification.
Figure 14C:
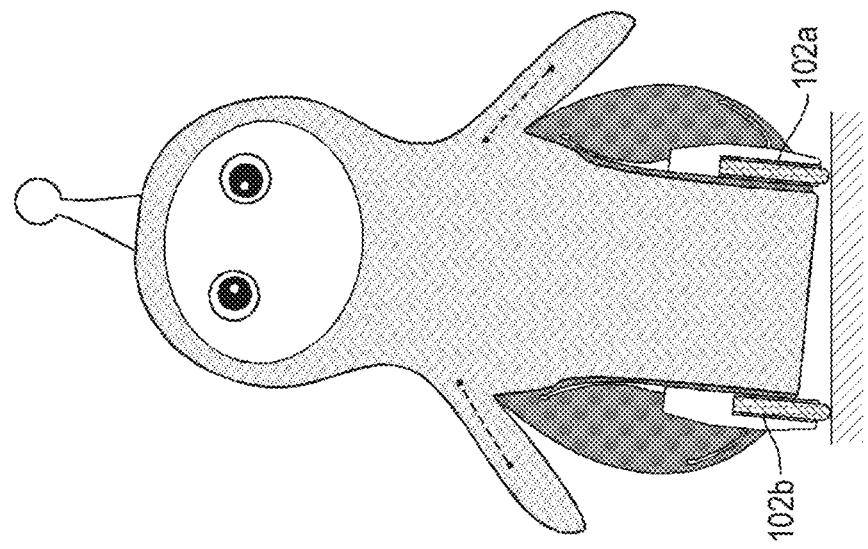
FIGS. 14A to 14C are drawings representing the wheel housing structure according to the fifth modification.
Figure 14B:
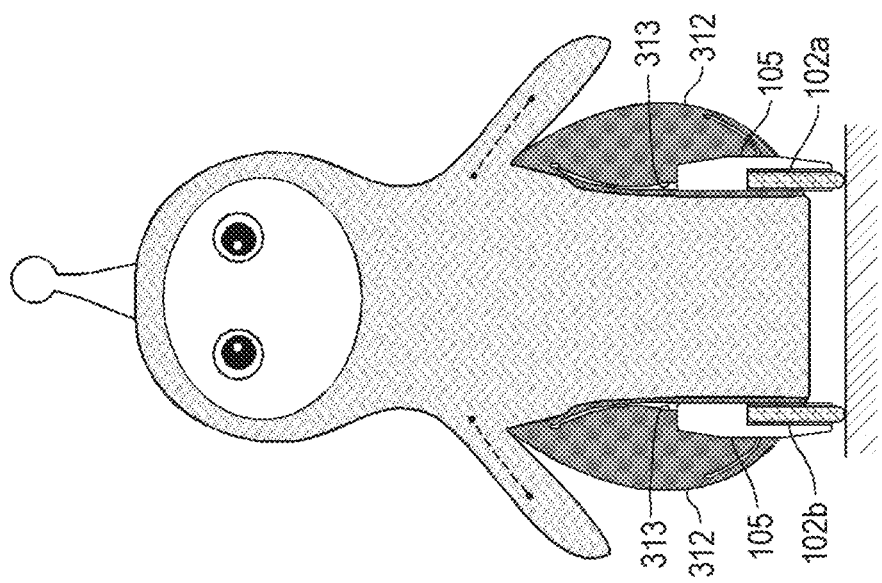
Figure 14A:
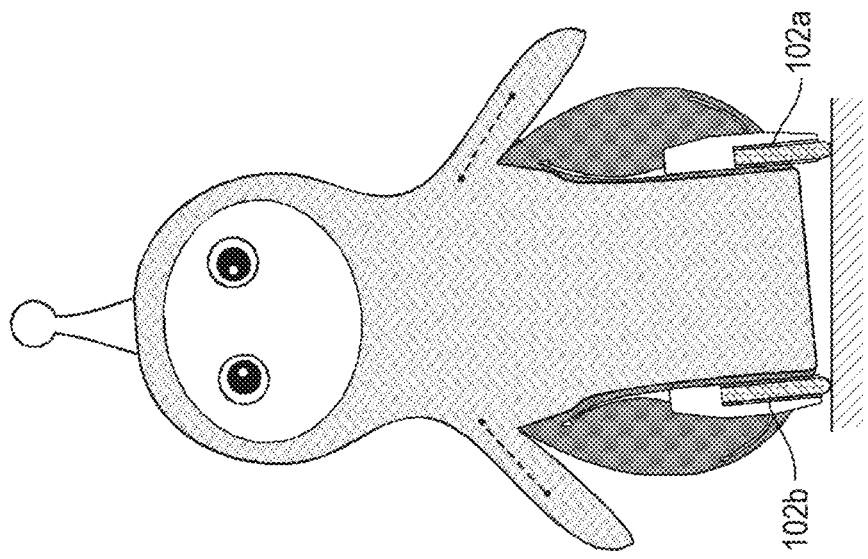

FIGS. 13 to 14C are drawings representing a wheel housing mechanism according to a fifth modification. FIG. 13 shows a sectional view of the robot, and FIGS. 14A to 14C show examples of a robot operation using the mechanism.

In the fifth modification, driving of the left and right front wheels 102 so as to advance and retreat is controlled individually, as shown in FIG. 13. That is, a pivot shaft 378a of the left front wheel 102a is connected to an actuator 379a, and a pivot shaft 378b of the right front wheel 102b is connected to an actuator 379b. Each of the actuators 379a and 379b is formed of an independent motor, and is driven individually.

According to this kind of configuration, timings of driving so as to advance and retreat can be staggered between left and right wheels. As shown in FIGS. 14A to 14C, a choice of motions can be enriched, such as the robot 100 raising one foot at a time while inclining the body to the left and right, swaying up and down to the left and right from an upright state, or traveling while swaying. An animal-like operation can also be realized.

In the embodiment, the front wheel 102 is given as an example of a movement mechanism housed in the housing space S, but the rear wheel 103 may be housed in the same way. That is, a closed space (housing space) may be provided between a rear face of the main body frame 310 and a cover (elastic body), and the rear wheel 103 housed therein. The cover undergoes an elastic transformation owing to a pressing force received in accompaniment to an advancing of the rear wheel 103, increasing the size of an aperture portion (slit) for exposing the rear wheel 103, and elastically recovers in accompaniment to a retreat of the rear wheel 103, reducing the size of the aperture portion. Although not mentioned in the embodiment, the rear wheel 103 may be configured of a ball-form caster. Alternatively, another wheel that moves freely forward and back and left and right, such as an omni wheel, may be employed as the rear wheel 103.

In the embodiment, a configuration wherein the cover 312 is obtained by the spring member 514 being insert molded into a resin material is adopted, but a configuration wherein the spring member 514 is mounted on a surface of a resin material may be adopted. For example, a configuration wherein the spring member 514 is fixed by sticking or the like to the inner face of the bulging portion 512 may be adopted. Alternatively, a configuration wherein two layers of rubber are stuck together, or the like, in a state sandwiching the spring member 514 may be employed.

In the embodiment, an example wherein the pair of covers 312 are joined is given. In a modification, a configuration may be such that the left and right covers are attached to a left side face and a right side face respectively of the main body frame 310 rather than being joined. Alternatively, a configuration wherein a spring member is disposed in each of a left region and a right region of a resin sheet, and the resin sheet wound around the trunk portion frame of the robot, may be adopted. A cover may be integrated as one portion of the outer skin, and put on the robot.

Although the cover is configured of rubber in the embodiment, the cover may be configured of a flexible member such as a resin with low elasticity. A material the same as that of the outer skin may be employed as a material of the cover. Although not mentioned in the embodiment, a magnet may be provided on an end edge of the slit 313, or in a vicinity thereof. Specifically, a magnet may be disposed on an end edge on the mounted portion 510 side of the slit 313. By so doing, the metal spring member 514 on the bulging portion 512 side and the magnet on the mounted portion 510 side are attracted by magnetic force, and the slit 313 is more easily closed, whereby the internal structure of the robot 100 can be rendered extremely difficult to see. An end edge on the bulging portion 512 side of the slit 313 and the end edge on the mounted portion 510 side are more easily brought close together. Alternatively, a magnet may be disposed on the end edge on the bulging portion 512 side of the slit 313 too. By so doing, the magnet on the bulging portion 512 side and the magnet on the mounted portion 510 side are attracted by magnetic force, and the slit 313 can be more easily closed.

In the embodiment, an example of a framework structure of the spring member 514 is given, but a lattice form, a mesh form, a honeycomb form, or other form may be employed. Although a spring member that does not have a framework structure may be employed, the form of the spring member is adjusted by providing a notch or the like, whereby an appropriate elasticity is obtained. Although a metal plate that functions as a capacitive sensor has been employed as the spring member 514, a spring member that does not have a sensor function may be employed. A spring member may be a resin member with greater elasticity than a molding resin (a resin for insert molding). For example, thermoforming may be implemented on a sheet member formed of a resin, thereby increasing elasticity. Specifically, a die coinciding with the form of the bulging portion 512 is prepared. Further, a resin sheet member is softened by heating in a state in which the resin sheet member is placed in the die, and caused to transform so as to coincide with the form of the die using vacuum pressure or compressed air pressure. By employing a resin member as a spring member in this way, the kind of springing back occurring when a metal plate is employed is unlikely to occur, and a form of each individual spring member can be stabilized. Alternatively, a spring member may be molded by carrying out injection molding of a resin material. When configuring a spring member using a resin member in this way, touch sensors (capacitive sensors) on either side may be provided as separate members.

In the embodiment, a configuration wherein the greater portion of the front wheel 102 is covered by the wheel cover 105 is given as an example. In a modification, a configuration wherein the wheel cover 105 is omitted, and an aperture portion is pushed apart by the front wheel 102, may be adopted. An aspect wherein the greater portion of the front wheel 102 is exposed outside the cover 312 when a wheel drive is carried out, but one portion is disposed in the interior of the cover 312, is shown in the embodiment. In a modification, the whole of the front wheel 102 may be exposed in the exterior when a wheel drive is carried out. In this case too, a configuration wherein a portion in a vicinity of the pivot shaft 378 in the wheel cover 105 is disposed in the interior of the cover 312 may be adopted.

In the embodiment, a configuration wherein the robot has a wheel as a "movement mechanism" is given as an example. In a modification, a configuration wherein a "movement mechanism" is a leg portion, and the robot is capable of walking, may be adopted. A drive mechanism drives the leg portion so as to reciprocate between a housing space inside the cover (an elastic body, a body forming member) and the exterior. At this time, an aperture portion formed between the main body frame and the cover, or in the cover itself, is pushed apart in accompaniment to an advancing of the leg portion. The cover elastically recovers in accompaniment to a housing of the leg portion, thereby closing the aperture portion.

Although not mentioned in the embodiment, a fall determining unit that determines that the robot has fallen may be included. The fall determining unit may determine that a fall has occurred based on, for example, a value detected by an acceleration sensor. That is, when the robot is determined to have fallen in a state wherein the wheel has advanced from the cover (elastic body), the drive mechanism may swiftly house the wheel in the cover, thereby absorbing a shock when the robot falls to a floor surface. In particular, damage to the wheel can be prevented or lessened in a structure that does not have a shock absorber (a spring or the like) in a wheel support portion, as is the case in the embodiment. Wheel housing control is executed for all wheels, including the front wheel and the rear wheel.

Although not mentioned in the embodiment, wheel housing conditions (retreat conditions) may be set as appropriate. For example, when a user is nearby, the robot may spontaneously house the wheels, sit down, and perform a gesture of asking for a hug. Specifically, the robot detecting a user within a predetermined distance may be adopted as a condition. Furthermore, the familiarity stored with respect to the user being of a reference value or greater may be included in the conditions.

Also, a housing condition in accordance with an aspect of contact with a user, such as a robot being lifted and hugged, may be set. Specifically, both sides of the robot (for example, the pair of bulging portions 512) being touched, and the robot being lifted up, may be adopted as the condition. The former can be detected by a touch sensor (a capacitive sensor formed of the spring member 514, or the like). The latter can be determined based on a detection by the acceleration sensor.

A fall being determined to have occurred during a wheel operation or immediately after an operation may be included in housing conditions. A robot has a step detecting unit (unshown) that detects a step in a floor surface. When the step detecting unit detects a step, the robot changes a route so as not to fall down the detected step. However, it is envisaged that when a force of a predetermined strength or greater is exerted on the robot from the exterior, such as when the robot is pushed by a child when positioned on the edge of the step, the robot will be unable to withstand the force, and will fall. In such a case, a fall determining unit determines immediately afterwards that a fall has occurred, and the wheels may be housed based on the fall detection and determination.

Wheel advancement conditions may also be set as appropriate. For example, with a robot being placed on a floor surface as a precondition, no user being detected within a predetermined distance may be adopted as an advancement condition. Not being touched by a user (no touch sensor detecting a touch) may be adopted as the said condition. Alternatively, a specific region not being touched by a user (a specific touch sensor not detecting a touch) may be adopted as the said condition. For example, neither side of a robot (the pair of bulging portions 512 or the like) being touched may be adopted as the said condition. Also, a preset waiting time (set time) elapsing after this kind of advancement condition is fulfilled may be included as an additional condition, and a wheel advancing operation executed when the additional condition is satisfied. By a waiting time being set in this way, the wheels remain housed even when, for example, the robot is placed in an unstable place and falls over, because of which an unintentional load being exerted on the wheels, and the wheels being damaged, can be prevented.

Although not mentioned in the embodiment, elasticity of the cover (elastic body) may be set as appropriate. By an elastic modulus of the cover being set to be low, a degree of transformation when the wheel is caused to advance or retreat increases, and an aperture region in a state wherein the wheel is exposed can be reduced in size. Meanwhile, by the elastic modulus of the cover being kept high, the wheel inside is easily protected when receiving a shock from the exterior. Because of this, the elastic modulus of a side of the cover nearer to the main body frame (an adjacent region) may be configured to be lower than the elastic modulus of a farther side (a distanced region) when the wheel advances or retreats through a gap between the cover and the main body frame.

Although not mentioned in the embodiment, a surface of a resin member configuring the cover may be covered with a material that has a pleasant texture, such as a suede material.

Figure 15A:
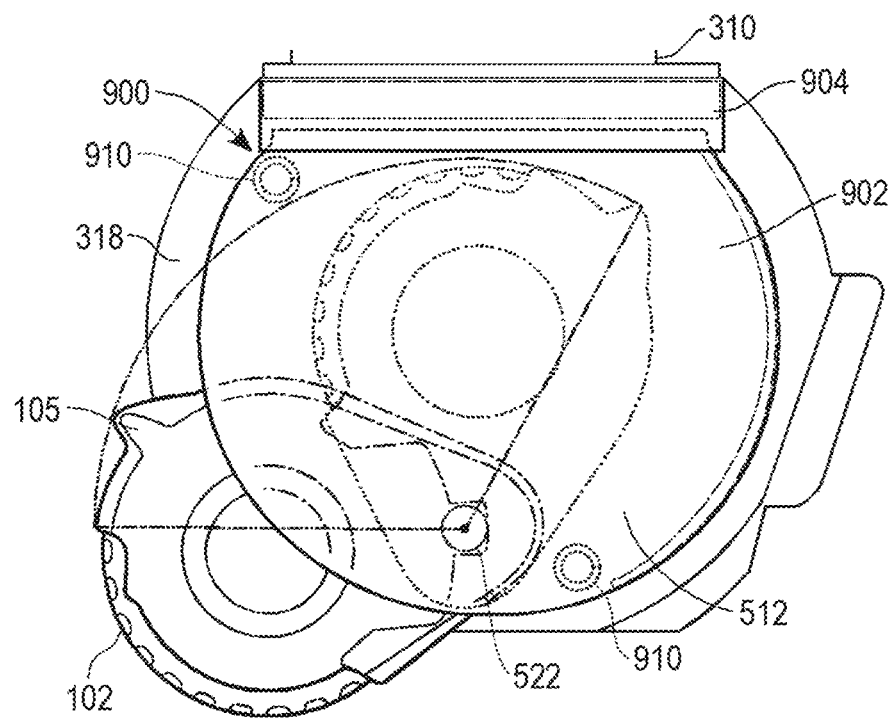
FIGS. 15A and 15B are drawings representing a wheel housing mechanism according to a sixth modification.
Figure 15B:
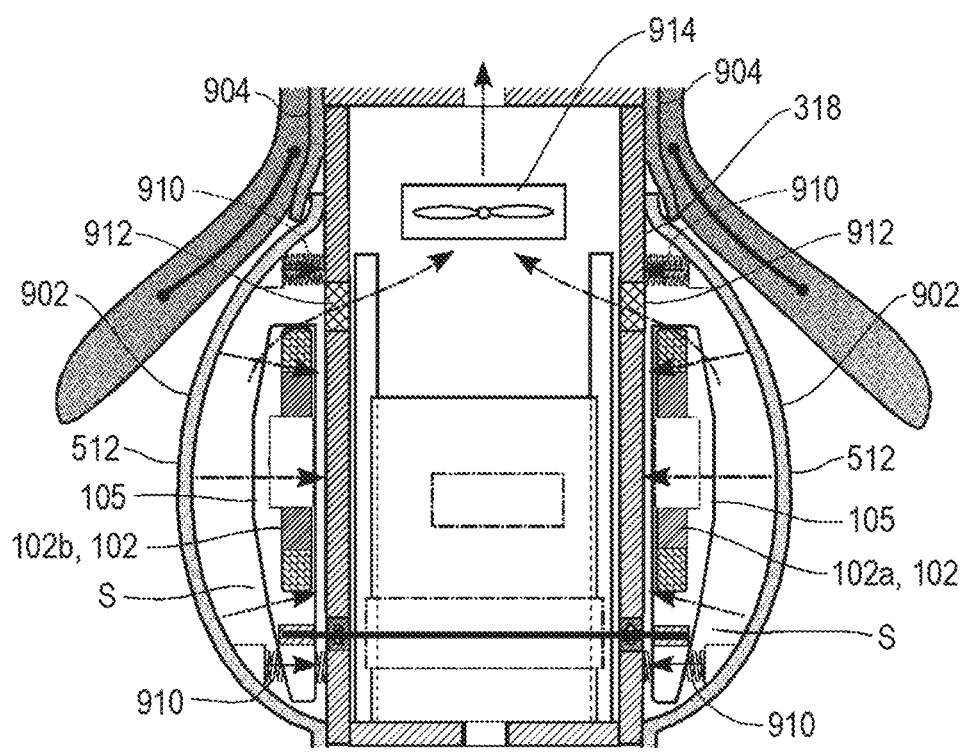

FIGS. 15A and 15B are drawings representing a wheel housing mechanism according to a sixth modification. FIG. 15A is a side view representing a structure of a wheel housing unit and a periphery thereof. FIG. 15B is a sectional view wherein a wheel housing state is seen from the front.

As seen in FIG. 15A, this modification includes a cover 900. The cover 900 includes a first cover 902 and a second cover 904. The first cover 902 has the bulging portion 512, and is of a bowl form (hemispherical form) overall, but an upper end is formed to be flat. A rear end portion of the first cover 902 is fixed to the trunk portion frame 318 along a peripheral edge thereof (refer to a dotted chain line region), but other portions, including an upper end portion, are unfixed. A place in the first cover 902 in which there is little transformation caused by an advance or a retreat of the front wheel 102 is fixed.

The second cover 904 is disposed above the first cover 902. The second cover 904 is formed of a soft rubber sheet, an upper half portion thereof is fixed to the trunk portion frame 318 (refer to a dotted chain line region), and a lower half portion is unfixed. A lower portion of the second cover 904 overlaps the upper end portion of the first cover 902, and even when an upper end aperture portion of the first cover 902 increases in size when the front wheel 102 advances or retreats, this can be covered and hidden. Also, when a soft material that can expand or contract to coincide with an opening state of the upper end aperture portion of the first cover 902 is used as a material of the second cover 904, the lower portion of the second cover may be bonded to the upper end portion of the first cover 902.

As shown in FIG. 15B, an inner edge portion (peripheral edge portion) of the first cover 902 comes into contact with a side face of the trunk portion frame 318, whereby a closed space is formed inside the bulging portion 512. The closed space functions as the housing space S.

A spring 910 is interposed between the trunk portion frame 318 and the first cover 902. The spring 910 is disposed on an upper front side and a lower rear side of the trunk portion frame 318 so as not to interfere with the track of the front wheel 102 and the wheel cover 105. When the front wheel 102 advances, an aperture portion is formed between a peripheral edge portion (a front end portion and a top end portion) of the first cover 902 and the trunk portion frame 318. Each spring 910 functions as a "biasing mechanism", and biases the first cover 902 in a direction approaching the trunk portion frame 318 (a direction that closes the aperture portion between the two) (refer to a solid arrow). Because of this, the aperture portion formed when the front wheel 102 advances can be reduced in size.

Furthermore, a communication hole 912 that connects the interior and the exterior is provided in the left and right side faces of the trunk portion frame 318, and a fan 914 is provided in the interior of the trunk portion frame 318. A filter that restricts encroachment of a foreign object into the interior of the trunk portion frame 318 is provided in the communication hole 912. The fan 914 is used for cooling the interior, but when the first cover 902 is closed, it becomes difficult for air from the exterior to flow in, and air from the housing space S is suctioned in by the fan 914 being driven (refer to a two-dotted chain line arrow). Because of this, negative pressure is created in the housing space S, and an advantage arises in that the first cover 902 is drawn to the trunk portion frame 318 side (refer to a dotted chain line arrow). As a result of this, the aperture portion can be more securely closed. When housing the front wheel 102, or when the robot detects a touch by a user, a rotational speed of the fan 914 may be increased. By so doing, the aperture portion can be more reliably closed.

In this modification, a configuration wherein an aperture portion is reduced in size using the biasing force of the spring 910 and the suctioning force of the fan 914 is given as an example, but one of these may be omitted. Also, although this modification is applied to a structure similar to that in FIGS. 11A to 11C (a structure wherein an aperture portion is formed between the trunk body frame 318 and the first cover 902), the modification may also be applied to the structure shown in FIG. 7 (a structure wherein a slit is formed in the cover itself). In this case, it is sufficient that a spring is disposed between the trunk portion frame and the protruding portion so as not to interfere with the track of the wheel.

Figure 16A:
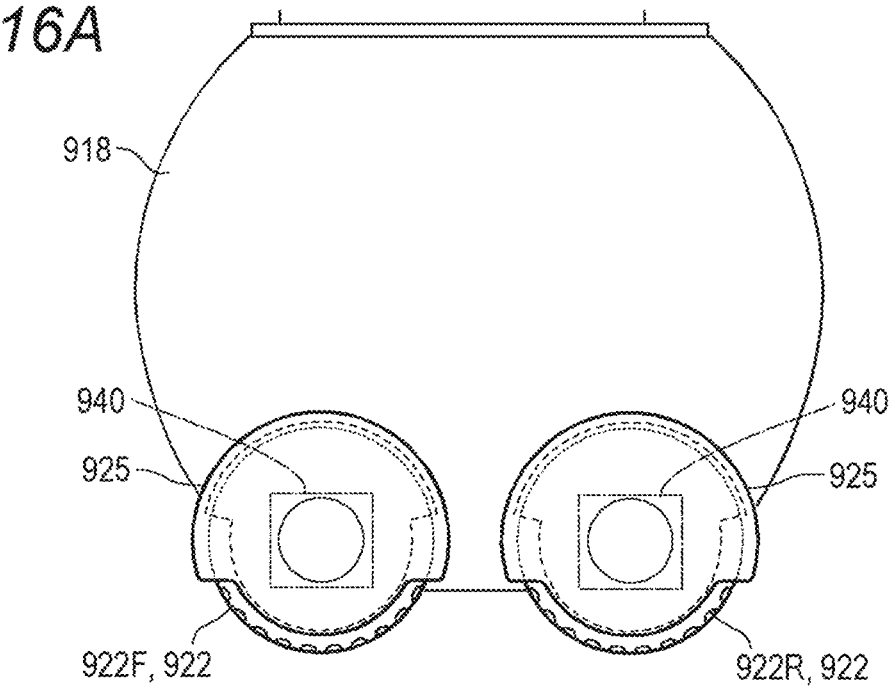
FIGS. 16A to 16C are drawings representing a wheel housing mechanism according to a seventh modification.
Figure 16B:
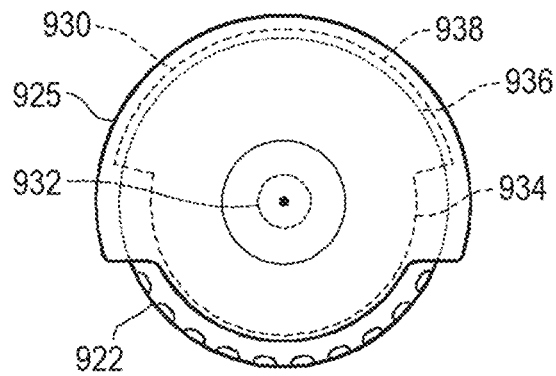
Figure 16C:
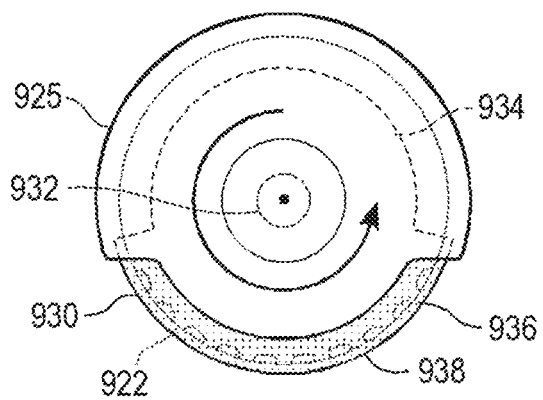

FIGS. 16A to 16C are drawings representing a wheel housing mechanism according to a seventh modification. FIG. 16A is a side view representing a structure of a wheel housing unit and a periphery thereof. FIG. 16B is a side view of a wheel, and FIG. 16C is a drawing representing a wheel housing mechanism operation.

In this modification, a robot has four wheels, as shown in FIG. 16A. A front wheel 922F is a drive wheel, and a rear wheel 922R is a driven wheel. When no particular distinction is made between the two, the two will collectively be called the "wheel 922". For convenience of description, only a left wheel is shown in the drawing. A right wheel is coupled to the left wheel via an axle omitted from the drawing.

A greater portion of the wheel 922, excepting a grounding surface thereof, is covered by a wheel cover 925. The wheel cover 925 is exposed in a side face of a trunk portion frame 918, and does not advance or retreat with respect to a housing space, as is the case in the embodiment. Meanwhile, as also shown in FIG. 16B, a housing cover 930 is disposed inside the wheel cover 925. The housing cover 930 is of an approximate disk form, and is provided so as to be able to rotate centered on a rotary shaft 932. An axial line of the rotary shaft 932 coincides with an axial line of the wheel 922. The housing cover 930 includes a small diameter portion 934 and a large diameter portion 936, and has a stepped form in a circumferential direction. The small diameter portion 934 has a smaller radius of curvature than that of the wheel 922, and the large diameter portion 936 has a larger radius of curvature than that of the wheel 922. An outer frame portion 938 of a predetermined height extends from an outer peripheral edge of the large diameter portion 936 toward the trunk portion frame 918 side. The height of the outer frame portion 938 is greater than a width of the wheel 922.

As shown in FIG. 16A, an actuator 940 is provided in the trunk portion frame 918. In this modification, a motor is employed as the actuator 940. The housing cover 930 can be caused to pivot by the operation control unit 152 driving the actuator 940. At a time of normal control, that is, in a state wherein the robot can travel, the housing cover 930 is caused to retreat inside the wheel cover 925, exposing the wheel 922, as shown in FIG. 16B. Meanwhile, when a wheel housing condition is fulfilled, the housing cover 930 is caused to pivot through a predetermined angle (180 degrees in this modification) by the actuator 940 being driven. Because of this, the housing cover 930 covers and hides the wheel 922, as shown in FIG. 16C. Detecting a state wherein a running face of the wheel 922 is suspended without being grounded, such as when the robot is lifted up, when the wheel 922 is not grounded on a floor surface, or when a distance between the seating face (bottom face) of the robot and the floor surface is greater than a predetermined distance, is defined as a wheel housing condition. The robot includes a housing condition determination unit (not shown) that, using various kinds of sensor, determines whether or not a state of the robot satisfies a wheel housing condition. When it is determined that a wheel housing condition is satisfied, the drive mechanism drives the housing cover 930 so as to advance. Because of this, the housing cover 930 covers and hides the wheel 922. By this kind of control being carried out when a user lifts and hugs the robot, a problem such as the wheel 922 interfering with the user or dirtying the user's clothing can be avoided. The heretofore described housing conditions (when a fall is detected, or the like) may be included as a wheel housing condition.

As this modification is a structure wherein the wheel is covered by the cover being moved, it is necessary to cause the cover to retreat before the cover is grounded on the floor surface when lowering the robot onto the floor surface. Because of this, the housing cover 930 is caused to retreat into an interior of the wheel cover 925 before the robot comes into contact with the floor surface when lowering the robot onto the floor surface from a state wherein a wheel housing condition is being satisfied. For example, the distance between the robot and the floor surface may be measured using a distance sensor that uses ultrasonic waves, infrared light, or the like, or may be measured using a barometer. Also, by an acceleration sensor being used together with these sensors, whether the wheel 922 is suspended above the floor surface, or whether the wheel 922 is about to come into contact with the floor surface from a suspended state, can be determined with high accuracy. The heretofore described advancement conditions (a specific region not being touched by a user, not falling, and the like) may be included as conditions for causing the wheel to be exposed in this way (conditions for causing the housing cover 930 to retreat). An orientation determining unit that determines an orientation of the robot may be provided. A configuration may be such that when the robot is in a lifted and hugged orientation (a horizontal hug or a vertical hug), or when the robot is in a predetermined orientation such as a fallen state, the cover is not caused to retreat even when the wheel comes into contact with a target object such as the floor surface. Also, an interface such as a switch that accepts a direct operation from a user may be provided in a specific place on the robot, and when the switch is operated, the housing cover 930 may be caused to advance, thereby covering and hiding the wheel 922, when the wheel is exposed, and the housing cover 930 may be caused to retreat, thereby exposing the wheel 922, when the wheel is being covered. In this way, a direct operation by a user may also be defined as a wheel housing condition and an advancement condition.

The robot of this modification can be expressed as the following technological idea. The robot includes a body, a movement mechanism having a surface that is grounded when moving, a cover that is supported by the body so as to be able to advance or retreat with respect to the movement mechanism, and which can cover the grounding surface by being driven so as to advance, a housing condition determination unit that determines whether or not a preset housing condition is fulfilled, and a drive mechanism that drives the cover so as to advance when the housing condition is fulfilled. The robot includes a sensor that detects a state of at least one of an interior and an exterior. The housing condition determination unit determines whether or not a housing condition is fulfilled based on information detected by the sensor. The robot may further include a housing continuation condition determination unit (not shown) that determines whether or not a preset housing continuation condition is fulfilled. The drive mechanism prohibits driving the cover so as to retreat while the housing continuation condition is being fulfilled. The robot may further include a lifting and hugging determination unit that determines that the robot is in a state of being lifted and hugged. The robot being in a state of being lifted and hugged may be included as the housing continuation condition.

Also, the robot can also be expressed in the following way. The robot includes a main body frame, a first cover fixed to the main body frame, a movement mechanism supported by the main body frame so as to cause one portion to be exposed outside the first cover, a second cover disposed in a space between the first cover and the main body frame, and a drive mechanism that causes the second cover to advance from the first cover or to retreat into an interior, wherein a closed space is formed between the second cover and the first cover by the second cover advancing, and the movement mechanism is housed in the closed space.

In this modification, the trunk portion frame 918 corresponds to the "main body frame", the wheel cover 925 corresponds to the "first cover", and the wheel 922 corresponds to the "movement mechanism". Also, the housing cover 930 corresponds to the "second cover", and the actuator 940 corresponds to the "drive mechanism". According to this modification, a problem of preventing or restricting a user from interfering with the movement mechanism when touching the robot, such as when lifting and hugging the robot, can be resolved.

In this modification, a configuration wherein the wheel cover 925 (a fixed cover fixed to the main body frame) and the housing cover 930 (a movable cover supported so as to be able to move by the main body frame) are provided, and the whole of the wheel 922 is housed by the two covers by the movable cover advancing from the fixed cover, is given as an example. In another modification, the fixed cover may be omitted. That is, a configuration may be such that the whole or one portion (including a grounding surface) of a wheel is exposed in a state wherein the movable cover has retreated, and the whole of the wheel is covered and hidden by the movable cover being caused to advance.

Ideas of the embodiment and the modifications can also be understood as the following kind of robot. The robot includes a body, a movement mechanism having a surface that is grounded when moving, and a cover that can cover the grounding surface of the movement mechanism. The robot has a main body frame, a cover that can form a closed space between the cover and the main body frame, and a movement mechanism having a surface that is grounded when moving, wherein the grounding surface is provided so as to be able to be housed in the closed space and able to be exposed outside the closed space. The robot includes a drive mechanism. The drive mechanism has at least one of a mechanism that drives the movement mechanism so as to advance from and retreat into the closed space and a mechanism that drives the cover so as to advance and retreat with respect to the movement mechanism. Although not mentioned in the embodiment and the modifications, a configuration wherein a wheel can be housed in the closed space by combining a drive causing the wheel to retreat and a drive causing the cover to advance may be adopted. According to an aspect wherein both the wheel and the cover are driven when housing the wheel, a drive amount of each can be reduced. Because of this, the wheel housing space in the body can be reduced in size, and a saving of space in the body can also be achieved.

What is claimed is:

1. A robot, comprising:
   a body frame;
   an elastic body defining a space between the elastic body and the body frame;
   a movement mechanism, wherein the movement mechanism is movable from a first position housed in the space to a second position protruding from the elastic body; and
   a drive mechanism for displacing the movement mechanism relative to the body frame to move the movement mechanism from the first position to the second position, wherein
   the elastic body having an aperture, wherein the aperture is elastically deformable, and the aperture is configured to transition from a first size when the movement mechanism is in the first position to a second size, greater than the first size, during transition of the movement mechanism from the first position to the second position.

2. The robot according to claim 1, wherein the elastic body has a curved form protruding in a direction away from the body frame for defining the space, and
   the elastic body is configured to change a shape or size of the curved form during transition of the movement mechanism from the first position to the second position.

3. The robot according to claim 1, wherein the aperture is a peripheral edge portion of the elastic body opposing the body frame.

4. The robot according to claim 1, further comprising a biasing mechanism configured to bias the elastic body in a direction that closes the aperture.

5. The robot according to claim 1, wherein the movement mechanism comprises a wheel and a wheel cover, and
   during transition of the movement mechanism from the first position to the second position, the wheel cover is configured to contact the aperture.

6. The robot according to claim 5, wherein the wheel cover has an outer face, and a shape of the outer face complements a shape of an inner face of the elastic body.

7. The robot according to claim 1, wherein the elastic body includes a spring, and a resin member, and the spring is connected to the resin member.

8. The robot according to claim 7, wherein the spring comprises a framework structure complementary with a form of the resin member.

9. The robot according to claim 7, wherein the resin member has a form that protrudes in a direction away from the body frame, and
the spring has a curved form complementary with the form of the resin member.

10. The robot according to claim 7, wherein the spring comprises a metal plate, and the metal plate is configured as a capacitive sensor.

11. The robot according to claim 1, wherein the aperture comprises a slit positioned along a movement path of the movement mechanism during transition from the first position to the second position.

12. The robot according to claim 1, wherein the elastic body and the body frame jointly define a body of the robot.

13. The robot according to claim 1, comprising a sensor configured to determine whether a fall of the robot has occurred, wherein
the drive mechanism is configured to cause the movement mechanism to transition from the second position to the first position in response to a determination that a fall has occurred.

14. A robot, comprising:
a body;
a cover surrounding the body, wherein the cover defines a space between an inner surface of the cover and the body;
a movement mechanism, wherein the movement mechanism is configured to transition from a first position within the space to a second position protruding from the cover, wherein a center of the movement mechanism at the second position is a different distance from the body than the center of the movement mechanism at the first position; and
a drive mechanism for driving the movement mechanism from the first position to the second position and from the second position to the first position, wherein the cover comprises a flexible region and an aperture in the flexible region, the movement mechanism is configured to pass through the aperture during a transition from the first position to the second position, and a size of the aperture increases during the transition of the movement mechanism from the first position to the second position.

15. The robot according to claim 14, wherein the cover is configured to generate a biasing force in a direction for closing the aperture when the size of the aperture portion is increasing.

16. The robot according to claim 7, wherein the spring comprises a plurality of holes, and adjacent holes of the plurality of holes are separated by a predetermined interval along the spring.

17. The robot according to claim 1, further comprising a sliding member on an inner side of the elastic body.

18. The robot according to claim 5, further comprising a sliding member along an edge of the aperture, wherein the wheel cover is configured to contact the sliding member during transition of the movement mechanism from the first position to the second position, and an abrasion resistance of the sliding member is greater than an abrasion resistance of the elastic body.

19. The robot according to claim 5, further comprising a spring within the elastic body, wherein the spring is between the wheel cover and the elastic body when the movement mechanism is in the first position.

20. The robot according to claim 5, wherein the wheel cover is partially within the space when the movement mechanism is in the second position.

21. The robot according to claim 1, wherein in the first position the movement mechanism is prevented from contacting a ground.

22. The robot according to claim 14, wherein the cover is configured to elastically deform, by a pressing force accompanying an advancing of the movement mechanism to the second position, to enlarge the aperture, and the cover is configured to elastically recover to reduce a size of the enlarged aperture following a retreat of the movement mechanism to the first position.

* * * * *